United States Patent
Ramchetty et al.

(10) Patent No.: US 12,452,273 B2
(45) Date of Patent: Oct. 21, 2025

(54) SYSTEMS, METHODS, AND DEVICES FOR PREVENTING CREDENTIAL PASSING ATTACKS

(71) Applicant: SentinelOne, Inc., Mountain View, CA (US)

(72) Inventors: Harinath Vishwanath Ramchetty, Bangalore (IN); Anil Gupta, Bangalore (IN)

(73) Assignee: SentinelOne, Inc, Mountain View, CA (US)

( * ) Notice: Subject to any disclaimer, the term of this patent is extended or adjusted under 35 U.S.C. 154(b) by 216 days.

(21) Appl. No.: 18/182,979

(22) Filed: Mar. 13, 2023

(65) Prior Publication Data
US 2023/0319087 A1     Oct. 5, 2023

Related U.S. Application Data

(60) Provisional application No. 63/325,419, filed on Mar. 30, 2022.

(51) Int. Cl.
*H04L 9/40*          (2022.01)

(52) U.S. Cl.
CPC ...... *H04L 63/1425* (2013.01); *H04L 63/0807* (2013.01); *H04L 63/0823* (2013.01); *H04L 63/1416* (2013.01); *H04L 63/1441* (2013.01)

(58) Field of Classification Search
CPC ............. H04L 63/1425; H04L 63/0807; H04L 63/0823; H04L 63/1416; H04L 63/1441
See application file for complete search history.

(56) References Cited

U.S. PATENT DOCUMENTS

| | | | |
|---|---|---|---|
| 4,979,118 A | 12/1990 | Kheradpir |
| 5,311,593 A | 5/1994 | Carmi |
| (Continued) | | |

FOREIGN PATENT DOCUMENTS

| | | |
|---|---|---|
| CN | 103607399 A | 2/2014 |
| CN | 109446755 A | 3/2019 |
| (Continued) | | |

OTHER PUBLICATIONS

AEfficient Virus Detection Using Dynamic Instruction Sequencesa—May 2009 (Year: 2009).
(Continued)

*Primary Examiner* — Kambiz Zand
*Assistant Examiner* — Afaq Ali
(74) *Attorney, Agent, or Firm* — Perkins Coie LLP

(57) ABSTRACT

In some embodiments, a computer-implemented method for preventing credential passing attacks may include receiving an input; determining whether the input is a credential access command, wherein the determination includes searching for occurrences of references to executables related to adding, reading, copying, or performing actions with respect to a credential, if the input is determined to be a credential access command, performing anomaly detection, wherein performing the anomaly detection includes evaluating whether a user is a valid domain user, whether an elapsed time of the credential is greater than a maximum lifetime of the credential, and whether a privilege attribute certificate of the credential is valid, determining that an anomaly exists if the command was generated by an invalid domain user, an elapsed time of a credential is greater than a maximum lifetime, or the privilege attribute certificate of the credential is invalid, and performing mitigation of the anomaly.

20 Claims, 7 Drawing Sheets

(56) References Cited

U.S. PATENT DOCUMENTS

| | | |
|---|---|---|
| 5,754,938 A | 5/1998 | Herz et al. |
| 6,026,474 A | 2/2000 | Carter et al. |
| 6,154,844 A | 11/2000 | Touboul et al. |
| 6,157,953 A | 12/2000 | Chang et al. |
| 6,728,716 B1 | 4/2004 | Bhattacharya et al. |
| 6,804,780 B1 | 10/2004 | Touboul |
| 6,836,888 B1 | 12/2004 | Basu et al. |
| 7,076,696 B1 | 7/2006 | Stringer |
| 7,093,239 B1 | 8/2006 | Van Der Made |
| 7,181,769 B1 | 2/2007 | Keanini et al. |
| 7,225,468 B2 | 5/2007 | Waisman et al. |
| 7,299,294 B1 | 11/2007 | Bruck et al. |
| 7,305,546 B1 | 12/2007 | Miller |
| 7,322,044 B2 | 1/2008 | Hrastar |
| 7,464,407 B2 | 12/2008 | Nakae et al. |
| 7,530,106 B1 | 5/2009 | Zaitsev et al. |
| 7,543,269 B2 | 6/2009 | Krueger et al. |
| 7,546,587 B2 | 6/2009 | Marr et al. |
| 7,574,740 B1 | 8/2009 | Kennis |
| 7,596,807 B2 | 9/2009 | Ptacek et al. |
| 7,596,808 B1 | 9/2009 | Wilkinson et al. |
| 7,665,139 B1 | 2/2010 | Szor et al. |
| 7,710,933 B1 | 5/2010 | Sundaralingam et al. |
| 7,739,516 B2 | 6/2010 | Brender et al. |
| 7,832,012 B2 | 11/2010 | Huddleston |
| 7,882,538 B1 | 2/2011 | Palmer |
| 7,890,612 B2 | 2/2011 | Todd et al. |
| 7,937,755 B1 | 5/2011 | Guruswamy |
| 7,958,549 B2 | 6/2011 | Nakae et al. |
| 7,975,018 B2 | 7/2011 | Unrau et al. |
| 7,984,129 B2 | 7/2011 | Vaught |
| 8,015,605 B2 | 9/2011 | Yegneswaran et al. |
| 8,024,795 B2 | 9/2011 | Newton |
| 8,042,186 B1 | 10/2011 | Polyakov et al. |
| 8,056,134 B1 | 11/2011 | Ogilvie |
| 8,065,722 B2 | 11/2011 | Barford et al. |
| 8,078,556 B2 | 12/2011 | Adi et al. |
| 8,082,471 B2 | 12/2011 | Khan |
| 8,131,281 B1 | 3/2012 | Hildner et al. |
| 8,141,154 B2 | 3/2012 | Gruzman et al. |
| 8,156,556 B2 | 4/2012 | Krishnamurthy |
| 8,171,545 B1 | 5/2012 | Cooley et al. |
| 8,181,033 B1 | 5/2012 | Paul et al. |
| 8,181,250 B2 | 5/2012 | Rafalovich et al. |
| 8,204,984 B1 | 6/2012 | Aziz et al. |
| 8,205,035 B2 | 6/2012 | Reddy et al. |
| 8,214,884 B2 * | 7/2012 | Xia ................. H04L 63/0281 <br> 713/153 |
| 8,230,505 B1 | 7/2012 | Ahrens et al. |
| 8,239,947 B1 | 8/2012 | Glick et al. |
| 8,296,842 B2 | 10/2012 | Singh et al. |
| 8,321,940 B1 * | 11/2012 | Pereira ................. G06F 21/554 <br> 726/23 |
| 8,327,442 B2 | 12/2012 | Herz et al. |
| 8,353,033 B1 | 1/2013 | Chen et al. |
| 8,370,931 B1 | 2/2013 | Chien et al. |
| 8,375,444 B2 | 2/2013 | Aziz et al. |
| 8,375,447 B2 | 2/2013 | Amoroso et al. |
| 8,413,238 B1 | 4/2013 | Sutton |
| 8,413,241 B2 | 4/2013 | Weeks et al. |
| 8,418,250 B2 | 4/2013 | Morris et al. |
| 8,438,386 B2 | 5/2013 | Hegli et al. |
| 8,438,626 B2 | 5/2013 | Anderson et al. |
| 8,443,442 B2 | 5/2013 | Wang et al. |
| 8,474,044 B2 | 6/2013 | Zawadowskiy et al. |
| 8,488,466 B2 | 7/2013 | Breslin et al. |
| 8,528,057 B1 | 9/2013 | Garrett |
| 8,528,087 B2 | 9/2013 | Hsu et al. |
| 8,538,578 B2 | 9/2013 | Battles et al. |
| 8,539,578 B1 | 9/2013 | Zhou et al. |
| 8,539,582 B1 | 9/2013 | Aziz et al. |
| 8,549,643 B1 | 10/2013 | Shou |
| 8,555,385 B1 | 10/2013 | Bhatkar et al. |
| 8,561,177 B1 | 10/2013 | Aziz et al. |
| 8,566,946 B1 | 10/2013 | Aziz et al. |
| 8,607,054 B2 | 12/2013 | Ramarathinam et al. |
| 8,607,340 B2 | 12/2013 | Wright |
| 8,627,475 B2 | 1/2014 | Loveland et al. |
| 8,677,494 B2 | 3/2014 | Edery et al. |
| 8,713,306 B1 | 4/2014 | Bennett |
| 8,719,937 B2 | 5/2014 | Sundaram et al. |
| 8,725,898 B2 | 5/2014 | Pradeep |
| 8,726,389 B2 | 5/2014 | Morris et al. |
| 8,732,296 B1 | 5/2014 | Thomas et al. |
| 8,752,173 B2 | 6/2014 | Yadav |
| 8,789,135 B1 | 7/2014 | Pani |
| 8,793,151 B2 | 7/2014 | Delzoppo et al. |
| 8,806,638 B1 | 8/2014 | Mani |
| 8,821,242 B2 | 9/2014 | Hinman et al. |
| 8,839,369 B1 | 9/2014 | Dai et al. |
| 8,844,041 B1 | 9/2014 | Kienzle et al. |
| 8,849,880 B2 | 9/2014 | Thelen |
| 8,850,582 B2 | 9/2014 | Endoh et al. |
| 8,880,435 B1 | 11/2014 | Catlett et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,904,527 B2 | 12/2014 | Dawson et al. |
| 8,943,594 B1 | 1/2015 | Arrowood |
| 8,949,986 B2 | 2/2015 | Ben-Shalom et al. |
| 8,959,338 B2 | 2/2015 | Snow et al. |
| 8,973,142 B2 | 3/2015 | Shulman et al. |
| 8,984,637 B2 | 3/2015 | Karecha et al. |
| 9,009,829 B2 | 4/2015 | Stolfo et al. |
| 9,027,135 B1 | 5/2015 | Aziz |
| 9,043,920 B2 | 5/2015 | Gula et al. |
| 9,081,747 B1 | 7/2015 | Tabieros et al. |
| 9,117,078 B1 | 8/2015 | Chien et al. |
| 9,141,792 B2 | 9/2015 | Baluda et al. |
| 9,166,993 B1 | 10/2015 | Liu |
| 9,185,136 B2 | 11/2015 | Dulkin et al. |
| 9,195,480 B2 | 11/2015 | Wang et al. |
| 9,197,601 B2 | 11/2015 | Pasdar |
| 9,213,838 B2 | 12/2015 | Lu |
| 9,225,734 B1 | 12/2015 | Hastings |
| 9,240,976 B1 | 1/2016 | Murchison |
| 9,246,774 B2 | 1/2016 | Mataitis et al. |
| 9,270,690 B2 | 2/2016 | Kraitsman et al. |
| 9,305,165 B2 | 4/2016 | Snow et al. |
| 9,329,973 B2 | 5/2016 | Bhuyan |
| 9,330,259 B2 | 5/2016 | Klein et al. |
| 9,356,942 B1 | 5/2016 | Joffe |
| 9,356,950 B2 | 5/2016 | Vissamsetty et al. |
| 9,369,476 B2 | 6/2016 | Chekina et al. |
| 9,386,034 B2 | 7/2016 | Cochenour |
| 9,398,001 B1 | 7/2016 | Tidd |
| 9,407,602 B2 | 8/2016 | Feghali et al. |
| 9,413,721 B2 | 8/2016 | Morris et al. |
| 9,420,002 B1 | 8/2016 | McGovern et al. |
| 9,430,646 B1 | 8/2016 | Mushtaq et al. |
| 9,432,360 B1 | 8/2016 | Triandopoulos et al. |
| 9,438,614 B2 | 9/2016 | Herz |
| 9,495,188 B1 | 11/2016 | Ettema et al. |
| 9,503,470 B2 | 11/2016 | Gertner et al. |
| 9,547,516 B2 | 1/2017 | Thakkar et al. |
| 9,578,045 B2 | 2/2017 | Jaroch et al. |
| 9,591,006 B2 | 3/2017 | Siva et al. |
| 9,601,000 B1 | 3/2017 | Gruss et al. |
| 9,602,531 B1 | 3/2017 | Wallace et al. |
| 9,606,893 B2 | 3/2017 | Gupta et al. |
| 9,607,146 B2 | 3/2017 | Sridhara et al. |
| 9,609,019 B2 | 3/2017 | Vissamsetty et al. |
| 9,628,498 B1 | 4/2017 | Aziz et al. |
| 9,641,544 B1 | 5/2017 | Treat et al. |
| 9,641,550 B2 | 5/2017 | Kraitsman et al. |
| 9,661,023 B1 | 5/2017 | Fang et al. |
| 9,705,904 B1 | 7/2017 | Davis et al. |
| 9,710,648 B2 | 7/2017 | Weingarten et al. |
| 9,712,547 B2 | 7/2017 | Touboul et al. |
| 9,749,349 B1 | 8/2017 | Czarny et al. |
| 9,769,204 B2 | 9/2017 | Vissamsetty et al. |
| 9,772,832 B2 | 9/2017 | Rubio |
| 9,781,148 B2 | 10/2017 | Mahaffey et al. |
| 9,807,092 B1 | 10/2017 | Gutzmann |

(56) References Cited

U.S. PATENT DOCUMENTS

| | | |
|---|---|---|
| 9,807,115 B2 | 10/2017 | Kolton et al. |
| 9,813,451 B2 | 11/2017 | Honda et al. |
| 9,871,766 B2 | 1/2018 | Syed et al. |
| 9,877,210 B1 | 1/2018 | Hildner et al. |
| 9,888,032 B2 | 2/2018 | Dekel et al. |
| 9,898,763 B1 | 2/2018 | Vaynblat et al. |
| 9,935,968 B2 | 4/2018 | Pal et al. |
| 9,942,270 B2 | 4/2018 | Vissamsetty et al. |
| 10,025,928 B2 | 7/2018 | Jaroch et al. |
| 10,044,675 B1 | 8/2018 | Ettema et al. |
| 10,102,374 B1 | 10/2018 | Cohen et al. |
| 10,169,586 B2 | 1/2019 | Maciejak et al. |
| 10,193,920 B2 | 1/2019 | Satish et al. |
| 10,237,282 B2 | 3/2019 | Nelson et al. |
| 10,250,636 B2 | 4/2019 | Vissamsetty et al. |
| 10,257,224 B2 | 4/2019 | Jaroch et al. |
| 10,284,591 B2 | 5/2019 | Giuliani et al. |
| 10,375,110 B2 | 8/2019 | Vissamsetty et al. |
| 10,382,484 B2 | 8/2019 | Shayevitz et al. |
| 10,476,891 B2 | 11/2019 | Vissamsetty et al. |
| 10,509,905 B2 | 12/2019 | Gupta et al. |
| 10,542,044 B2 | 1/2020 | Vissamsetty et al. |
| 10,567,431 B2 | 2/2020 | Vissamsetty et al. |
| 10,574,698 B1 | 2/2020 | Sharifi Mehr |
| 10,599,842 B2 | 3/2020 | Vissametty et al. |
| 10,599,844 B2 | 3/2020 | Schmidtler et al. |
| 10,609,074 B2 | 3/2020 | Vissamsetty et al. |
| 10,757,090 B2 | 8/2020 | Kahol et al. |
| 10,769,267 B1* | 9/2020 | Li .................... G06F 21/316 |
| 10,826,941 B2 | 11/2020 | Jain et al. |
| 10,855,671 B2 | 12/2020 | Kahol et al. |
| 10,938,854 B2 | 3/2021 | Strogov et al. |
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,310,262 B1 | 4/2022 | Oliphant et al. |
| 11,316,879 B2 | 4/2022 | Ott et al. |
| 11,330,005 B2* | 5/2022 | Beauchesne ........ H04L 63/1408 |
| 11,363,031 B2 | 6/2022 | Carnes et al. |
| 11,379,607 B2 | 7/2022 | Swafford |
| 11,470,115 B2 | 10/2022 | Vissamsetty et al. |
| 11,481,503 B2 | 10/2022 | Gitelman et al. |
| 11,507,663 B2 | 11/2022 | Cohen et al. |
| 11,522,894 B2 | 12/2022 | Weingarten et al. |
| 11,539,722 B2 | 12/2022 | Singh et al. |
| 11,579,857 B2 | 2/2023 | Montag et al. |
| 11,580,218 B2 | 2/2023 | Salem et al. |
| 11,615,184 B2 | 3/2023 | Kutt et al. |
| 11,695,800 B2 | 7/2023 | Vissamsetty et al. |
| 11,734,303 B2 | 8/2023 | Cruanes et al. |
| 11,888,897 B2 | 1/2024 | Vissamsetty et al. |
| 11,997,139 B2 | 5/2024 | Vissamsetty et al. |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0126464 A1 | 7/2003 | McDaniel et al. |
| 2003/0145225 A1 | 7/2003 | Bruton et al. |
| 2003/0145226 A1 | 7/2003 | Bruton et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 | 5/2005 | Khazan et al. |
| 2005/0138402 A1 | 6/2005 | Yoon et al. |
| 2005/0160480 A1 | 7/2005 | Birt et al. |
| 2005/0193173 A1 | 9/2005 | Ring et al. |
| 2005/0198507 A1 | 9/2005 | Brender et al. |
| 2005/0204157 A1 | 9/2005 | Johnson |
| 2005/0223239 A1 | 10/2005 | Dotan |
| 2005/0240906 A1 | 10/2005 | Kinderknecht et al. |
| 2005/0240989 A1 | 10/2005 | Kim et al. |
| 2005/0288939 A1 | 12/2005 | Peled et al. |
| 2006/0053490 A1 | 3/2006 | Herz et al. |
| 2006/0085543 A1 | 4/2006 | Hrastar et al. |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0179296 A1 | 8/2006 | Bartlett et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0192500 A1 | 8/2007 | Lum |
| 2007/0208822 A1 | 9/2007 | Wang et al. |
| 2007/0208936 A1 | 9/2007 | Ramos Robles |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0266422 A1 | 11/2007 | Germano et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0148381 A1 | 6/2008 | Aaron |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2008/0244694 A1 | 10/2008 | Neystadt et al. |
| 2008/0267144 A1 | 10/2008 | Jano et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |

(56) References Cited

U.S. PATENT DOCUMENTS

| | | |
|---|---|---|
| 2010/0332498 A1 | 12/2010 | Svore et al. |
| 2010/0333177 A1 | 12/2010 | Donley et al. |
| 2011/0023118 A1 | 1/2011 | Wright |
| 2011/0067107 A1 | 3/2011 | Weeks et al. |
| 2011/0078309 A1 | 3/2011 | Bloch et al. |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen et al. |
| 2011/0178930 A1 | 7/2011 | Scheidt et al. |
| 2011/0185430 A1 | 7/2011 | Sallam |
| 2011/0209219 A1 | 8/2011 | Zeitlin et al. |
| 2011/0214176 A1 | 9/2011 | Burch et al. |
| 2011/0214182 A1 | 9/2011 | Adams et al. |
| 2011/0219443 A1 | 9/2011 | Hampel et al. |
| 2011/0219449 A1 | 9/2011 | St et al. |
| 2011/0225655 A1 | 9/2011 | Niemelä et al. |
| 2011/0247071 A1 | 10/2011 | Hooks et al. |
| 2011/0252434 A1 | 10/2011 | Stokes |
| 2011/0271341 A1 | 11/2011 | Satish et al. |
| 2011/0276597 A1 | 11/2011 | Little |
| 2011/0288940 A1 | 11/2011 | Horadan et al. |
| 2012/0023572 A1 | 1/2012 | Williams et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0096516 A1* | 4/2012 | Sobel .............. G06F 21/645 726/2 |
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Narayanaswamy et al. |
| 2012/0254995 A1 | 10/2012 | Sallam |
| 2012/0255003 A1 | 10/2012 | Sallam |
| 2012/0255004 A1 | 10/2012 | Sallam |
| 2012/0255012 A1 | 10/2012 | Sallam |
| 2012/0255031 A1 | 10/2012 | Sallam |
| 2012/0291090 A1 | 11/2012 | Srinivasan et al. |
| 2012/0297486 A1 | 11/2012 | Turbin |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0198842 A1 | 8/2013 | Klein et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0239192 A1 | 9/2013 | Linga et al. |
| 2013/0242743 A1 | 9/2013 | Thomas et al. |
| 2013/0246685 A1 | 9/2013 | Bhargava et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0020046 A1 | 1/2014 | Heitzman |
| 2014/0046645 A1 | 2/2014 | White et al. |
| 2014/0053267 A1 | 2/2014 | Klein et al. |
| 2014/0059525 A1 | 2/2014 | Jawa et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0114609 A1 | 4/2014 | Maurer et al. |
| 2014/0123280 A1 | 5/2014 | Kedma et al. |
| 2014/0137246 A1 | 5/2014 | Baluda et al. |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0196108 A1 | 7/2014 | Barr et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0270157 A1 | 9/2014 | Youd et al. |
| 2014/0280864 A1 | 9/2014 | Yin et al. |
| 2014/0282816 A1 | 9/2014 | Xie et al. |
| 2014/0283038 A1 | 9/2014 | Call et al. |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2014/0373091 A1 | 12/2014 | Kirner et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0067763 A1 | 3/2015 | Dalcher et al. |
| 2015/0074744 A1 | 3/2015 | McLean et al. |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Ben et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala et al. |
| 2015/0156214 A1 | 6/2015 | Kaminsky |
| 2015/0161024 A1 | 6/2015 | Gupta et al. |
| 2015/0161386 A1 | 6/2015 | Gupta et al. |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0200955 A1 | 7/2015 | Martin |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0268989 A1 | 9/2015 | Busch et al. |
| 2015/0271200 A1 | 9/2015 | Brady et al. |
| 2015/0281267 A1 | 10/2015 | Danahy et al. |
| 2015/0286820 A1 | 10/2015 | Sridhara et al. |

(56) References Cited

U.S. PATENT DOCUMENTS

| | | |
|---|---|---|
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0332043 A1 | 11/2015 | Russello |
| 2015/0346066 A1 | 12/2015 | Dutta et al. |
| 2015/0350213 A1 | 12/2015 | Varadarajan et al. |
| 2015/0350236 A1 | 12/2015 | Klinghofer et al. |
| 2015/0358345 A1 | 12/2015 | Clark et al. |
| 2015/0370560 A1 | 12/2015 | Tan et al. |
| 2015/0373039 A1 | 12/2015 | Wang |
| 2015/0379371 A1 | 12/2015 | Yoon et al. |
| 2015/0381376 A1 | 12/2015 | Wardman et al. |
| 2016/0028750 A1 | 1/2016 | Di et al. |
| 2016/0042179 A1 | 2/2016 | Weingarten et al. |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0065675 A1 | 3/2016 | Brand |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von et al. |
| 2016/0323300 A1 | 11/2016 | Boss et al. |
| 2016/0323316 A1 | 11/2016 | Kolton et al. |
| 2016/0335110 A1 | 11/2016 | Paithane et al. |
| 2016/0359915 A1 | 12/2016 | Gupta et al. |
| 2016/0381023 A1 | 12/2016 | Dulce et al. |
| 2017/0009391 A1 | 1/2017 | Fu et al. |
| 2017/0019425 A1 | 1/2017 | Ettema et al. |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0142068 A1 | 5/2017 | Devarajan et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180345 A1* | 6/2017 | Mohan .................. H04L 63/083 |
| 2017/0180421 A1 | 6/2017 | Shieh et al. |
| 2017/0201545 A1 | 7/2017 | Nicodemus et al. |
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao et al. |
| 2017/0250855 A1 | 8/2017 | Patil et al. |
| 2017/0257375 A1* | 9/2017 | Dulkin .................... H04L 63/20 |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027009 A1 | 1/2018 | Santos et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |
| 2018/0089431 A1 | 3/2018 | Nalluri et al. |
| 2018/0091553 A1 | 3/2018 | Mandyam et al. |
| 2018/0124096 A1 | 5/2018 | Schwartz et al. |
| 2018/0143915 A1 | 5/2018 | Gonzalez et al. |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0191593 A1 | 7/2018 | De et al. |
| 2018/0212999 A1 | 7/2018 | Kassimis et al. |
| 2018/0225592 A1 | 8/2018 | Ponnuswamy |
| 2018/0248896 A1 | 8/2018 | Challita et al. |
| 2018/0343281 A1 | 11/2018 | Ahuja et al. |
| 2018/0359272 A1 | 12/2018 | Mizrachi et al. |
| 2018/0359278 A1 | 12/2018 | Rusakov et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Gupta et al. |
| 2019/0089677 A1 | 3/2019 | Ashley et al. |
| 2019/0114426 A1 | 4/2019 | Cohen et al. |
| 2019/0138639 A1 | 5/2019 | Pal et al. |
| 2019/0138725 A1 | 5/2019 | Gupta |
| 2019/0199736 A1 | 6/2019 | Howard et al. |
| 2019/0253453 A1 | 8/2019 | Vissamsetty et al. |
| 2019/0258807 A1 | 8/2019 | Dimaggio et al. |
| 2019/0294485 A1 | 9/2019 | Kukreja et al. |
| 2019/0294614 A1 | 9/2019 | Brodt et al. |
| 2019/0312904 A1 | 10/2019 | Stevens et al. |
| 2019/0318100 A1 | 10/2019 | Bhatia et al. |
| 2019/0340353 A1 | 11/2019 | Mitelman |
| 2019/0349369 A1 | 11/2019 | Bengtson et al. |
| 2019/0354355 A1 | 11/2019 | Jacobson et al. |
| 2019/0379697 A1 | 12/2019 | Vissamsetty et al. |
| 2019/0392260 A1 | 12/2019 | Pang et al. |
| 2020/0050586 A1 | 2/2020 | Pal et al. |
| 2020/0051697 A1 | 2/2020 | Krishnamurti et al. |
| 2020/0076853 A1 | 3/2020 | Pandian et al. |
| 2020/0133865 A1 | 4/2020 | Mannava et al. |
| 2020/0137114 A1 | 4/2020 | Bender et al. |
| 2020/0143054 A1 | 5/2020 | Cohen et al. |
| 2020/0143061 A1 | 5/2020 | Kim et al. |
| 2020/0159841 A1 | 5/2020 | Tabares et al. |
| 2020/0201620 A1 | 6/2020 | Beard |
| 2020/0218806 A1 | 7/2020 | Cho |
| 2020/0244677 A1 | 7/2020 | Abbaszadeh et al. |
| 2020/0252429 A1 | 8/2020 | Vissamsetty et al. |
| 2020/0274894 A1 | 8/2020 | Argoeti et al. |
| 2020/0351245 A1 | 11/2020 | Moore et al. |
| 2020/0366686 A1 | 11/2020 | Gal et al. |
| 2020/0374087 A1 | 11/2020 | Vissamsetty et al. |
| 2020/0389432 A1 | 12/2020 | Panchalingam et al. |
| 2021/0021572 A1 | 1/2021 | Bonczar |
| 2021/0029153 A1 | 1/2021 | Sugimoto et al. |
| 2021/0037046 A1 | 2/2021 | Dhillon |
| 2021/0044623 A1 | 2/2021 | Bosch et al. |
| 2021/0073374 A1 | 3/2021 | Mookken et al. |
| 2021/0073658 A1 | 3/2021 | Poole et al. |
| 2021/0117232 A1 | 4/2021 | Sriharsha et al. |
| 2021/0185538 A1 | 6/2021 | Zhang et al. |
| 2021/0203699 A1 | 7/2021 | Schmugar |
| 2021/0232291 A1 | 7/2021 | Abdulaal et al. |
| 2021/0263945 A1 | 8/2021 | Siebel et al. |
| 2021/0397696 A1* | 12/2021 | Yarabolu ............... G06F 21/554 |

(56) References Cited

U.S. PATENT DOCUMENTS

| | | |
|---|---|---|
| 2021/0397710 A1 | 12/2021 | Cohen et al. |
| 2022/0050895 A1 | 2/2022 | Yu et al. |
| 2022/0070256 A1 | 3/2022 | Singh et al. |
| 2022/0086142 A1 | 3/2022 | Hecht |
| 2022/0101096 A1 | 3/2022 | Singer et al. |
| 2022/0164444 A1 | 5/2022 | Prudkovskij |
| 2022/0253526 A1 | 8/2022 | Sanders |
| 2022/0391496 A9 | 12/2022 | Salem et al. |
| 2022/0414676 A1 | 12/2022 | Power et al. |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |
| 2023/0053937 A1 | 2/2023 | Choi et al. |
| 2023/0247046 A1 | 8/2023 | Peters et al. |
| 2023/0247048 A1 | 8/2023 | Samosseiko et al. |
| 2023/0291769 A1 | 9/2023 | Talur et al. |
| 2023/0319089 A1 | 10/2023 | Chesla et al. |
| 2023/0336573 A1 | 10/2023 | Jones |
| 2023/0362187 A1 | 11/2023 | Walch et al. |

FOREIGN PATENT DOCUMENTS

| | | |
|---|---|---|
| CN | 113297584 A | 8/2021 |
| CN | 113434858 A | 9/2021 |
| EP | 3171568 A1 | 5/2017 |
| EP | 3472746 A1 | 4/2019 |
| EP | 3968197 A1 | 3/2022 |
| ES | 2785350 T3 | 10/2020 |
| JP | 2006-106939 A | 4/2006 |
| JP | 2008-252625 A | 10/2008 |
| JP | 2013-168141 A | 8/2013 |
| JP | 2015-534690 A | 12/2015 |
| JP | 2016-512631 A | 4/2016 |
| JP | 2017-504102 A | 2/2017 |
| KR | 10-2015-0101811 A | 9/2015 |
| KR | 10-1969572 B1 | 4/2019 |
| KR | 10-2021-0079494 A | 6/2021 |
| WO | 02/27440 A2 | 4/2002 |
| WO | 2010/030169 A2 | 3/2010 |
| WO | 2012/027669 A1 | 3/2012 |
| WO | 2013/014672 | 1/2013 |
| WO | 2013/121951 A1 | 8/2013 |
| WO | 2014/126779 A1 | 8/2014 |
| WO | 2015/171780 A1 | 11/2015 |
| WO | 2015/171789 A1 | 11/2015 |
| WO | 2016/024268 A1 | 2/2016 |
| WO | 2016/081561 A1 | 5/2016 |
| WO | 2017/064710 A1 | 4/2017 |
| WO | 2017/068889 A1 | 4/2017 |
| WO | 2017/218872 A1 | 12/2017 |
| WO | 2019/032728 A1 | 2/2019 |
| WO | 2019/092530 A1 | 5/2019 |
| WO | 2019/245107 A1 | 12/2019 |
| WO | 2020/108357 A1 | 6/2020 |
| WO | 2022/076234 A1 | 4/2022 |

OTHER PUBLICATIONS

IBM Security Guardium Insights for IBM Cloud Park for Security, printed from https://www.ibm.com/downloads/cas/QY1RYRLP, printed May 26, 2021 in 12 pages.

"IBM Security Qradar SIEM Installation Guide" downloaded from http://www.siem.su/docs/ibm/Installation_andupdating/IBM_SecurityQRadar installation_Guide.pdf, printed 2013, vol. 7.2 in 54 pages.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.

Abdelhameed, M.U, et al. Portable executable automatic protection using dynamic infection and code redirection; 2009 International Conference on Computer Engineering & Systems (pp. 501-507); (Year: 2009).

Abrath, Bert et al. Obfuscating Windows DLLs; 2015 IEEE/ACM 1st International Workshop on Software Protection (pp. 24-30); (Year: 2015).

Barbhuiya et al., "Detection of neighbor solicitation and advertisement spoofing in IPV6 neighbor discovery protocol." Proceedings of the 4th international conference on Security of information and networks. (2011).

Birrer, B, et al., "Using qualia and hierarchical models in malware detection", Journal of Information Assurance and Security, Dec. 29, 2009, pp. 247-255.

Chakraborty et al., "Hierarchical learning for automated malware classification", MILCOM 2017-2017 IEEE Military Communications Conference (MILCOM), Oct. 23-25, 2017, pp. 1-6.

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

IBM Guardium Documentation "Components and Topology", downloaded from https://www.ibm.com/docs/en/qsip/7.4?topic=deployment-qradar-architecture-overview, printed on Jun. 8, 2021, in 3 pages.

IBM Security Qradar Solution Brief "Visibility, detection, investigation and response" printed from https://www.ibm.com/downloads/cas/OP62GKAR, printed on May 26, 2021, in 11 pgs.

IBM Software, "Stepping up the battle against advanced threats", IBM Trusteer Apex Thought Leadership White Paper, Dec. 2013, WGW03043-USEN-OO.

IBM, "Qradar Architecture overview", downloaded from https://www.ibm.com/docs/en/qsip/7.4?topic=deployment-qradar-architecture-overview printed May 28, 2021, in 6 DQS.

Installing a Tanium Client—distributed also using user/password (not encrypted) from a hosted Module server, downloaded from https://docs.tanium.com/client/client/deployment.html#client_management on Aprill, 2021.

Jack Ullrich, Detecting Manual Syscalls from User Mode, Winternl, Cybersecurity Research & Development, Feb. 10, 2021, 11 pages, https://winternl.com/detecting-manual-syscalls-from-user-mode/.

Laureano et al., M., "Intrusion detection in virtual machine environments. In Euromicro Conference, 2004. Proceedings." 30th (pp. 520-525). IEEE Sep. 30, 2004.

Liu et al., "Detecting Trojan Horses Based on System Behavior Using Machine Learning Method", International Conference on Machine Learning and Cybernetics (ICMLC), IEEE, Jul. 11-14, 2010, 02:S. 855-860.

Mahler, "A New Methodology for Information Security Risk Assessment for Medical Devices and Its Evaluation," 2020, The Department of Software and Information Systems Engineering, Ben-Gurion University of the Negev, Israel.

Matsuda, Wataru et al. "Real-Time Detection System Against Malicious Tools by Monitoring DLL on Client Computers;" 2019 IEEE Conference on Application, Information and Network Security (AINS) (pp. 36-41); (Year: 2019).

Moussaileb et al., "Ransomware's Early Mitigation Mechanisms," Proceedings ARES 2018 Proceedings of the 13th International Conference on Availability, Reliability and Security Article No. 2, 02:S 1-10 (2018).

Nisslmueller, U., "LOLBin detection through unsupervised learning An approach based on explicit featurization of the command line and parent-child relationships", University of Twente, Student Theses, Sep. 27, 2022, 72 pages.

Ornaghi et al., "Man in the middle attacks." Blackhat Conference Europe (2003).

(56) References Cited

OTHER PUBLICATIONS

Pandian, "Security Challenges of IoT and Medical Devices in Healthcare," Internet of Things, 1st Edition, 2020, Chapter 6, pp. 87-106.

Ramachandran et al., "Detecting ARP spoofing: An active technique." International Conference on Information Systems Security, Springer, Berlin, Heidelberg (2005).

Reaqta Hive, A.I. Based Endpoint Threat Response, Whitepaper, 27 pages (Apr. 6, 2017).

Schollmeier, "A Definition of Peer-to-Peer Networking for the Classification of Peer-to-Peer Architectures and Applications," Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security ofInternet and Systems (CRISIS) (pp. 1-8). IEEE., Oct. 31, 2012.

Shun-Wen Hsiao et al., "Sequence Feature Extraction for Malware Family Analysis via Graph Neural," Network, arXiv:2208.05476v1, Aug. 10, 2022, pp. 1-12.

Stine, "A cyber risk scoring system for medical devices," International Journal of Critical Infrastructure Protection, Dec. 2017, vol. 19, pp. 32-46.

Tanium™ Client Management 1.6 User Guide, downloaded from https://docs.tanium.com/client_management/client_management/index.html on Apr. 1, 2021.

Ullrich et al., "IPV6 Security: Attacks and Countermeasures in a Nutshell." 8th USENIX Workshop on Offensive Technologies (2015).

Xu et al., "Polymorphic Malicious Executable Scanner by API Sequence Analysis", Fourth International Conference on Hybrid Intelligent Systems, IEEE Dec. 5-8, 2004, pp. 378-383.

Zaldivar, "Investigating the Security Threats on Networked Medical Devices," 2020, 10th Annual Computing and Communication Workshop and Conference, Jan. 2020.

Bert Abrath • Bart Coppens• Stijn Volckaert• Bjorn De Sutter; Obfuscating Windows DLLs; 2015 IEEE/ACM 1st International Workshop on Software Protection (2015, pp. 24-30); (Year: 2015).

U.S. Appl. No. 61/989,965, filed May 7, 2014, "Distributed System for Bot Detection", 54 pages.

\* cited by examiner

SYSTEMS, METHODS, AND DEVICES FOR PREVENTING CREDENTIAL PASSING ATTACKS

INCORPORATION BY REFERENCE TO ANY PRIORITY APPLICATIONS

This application claims the benefit of U.S. Provisional Application No. 63/325,419, filed Mar. 30, 2022, and titled PREVENTING CREDENTIAL PASSING ATTACKS. Each of the foregoing applications is hereby incorporated by reference in their entirety.

Any and all applications for which a foreign or domestic priority claim is identified in the Application Data Sheet as filed with the present application are hereby incorporated by reference under 37 CFR 1.57.

BACKGROUND

Field

The embodiments herein are generally directed to systems, methods, and devices for computer security.

Description

There are various forms of credential passing attacks whereby an attacker attempts to use a credential obtained on one node of a network to gain access to one or more other nodes. Forms of credential passing attacks may include, for example, pass the ticket (PTT) attacks, pass the hash (PTH) attacks, ticket granting ticket (TGT) attacks (also known as a "golden ticket attack"), and ticket granting service (TGS) attacks (also known as silver ticket attacks). As known generally in the field, a PTT attack is a credential theft technique that enables attackers to use stolen tickets to authenticate to resources without compromising a user's password. TGT and TGS attacks may work in a similar fashion. A PTH attack is a technique in which an attacker captures a password hash and simply passes it through for authentication to a network system.

Novel techniques for detecting and preventing credential passing attacks are needed.

SUMMARY OF THE INVENTION

Various embodiments described herein relate to systems, devices, and methods for preventing credential passing attacks. For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some embodiments, described herein is a computer-implemented method for preventing credential passing attacks, the computer-implemented method comprising: receiving, by a computer system, an input; determining, by a credential passing mitigation module, whether the input is a credential access command, wherein the determination of whether the input is a credential access command comprises searching for occurrences of references to executables related to adding, reading, copying, or performing actions with respect to a credential in a user session; if the input is determined to be a credential access command, performing, by an anomaly detection module, anomaly detection corresponding to the credential access command, wherein performing the anomaly detection comprises: evaluating whether a user is a valid domain user to which the credentials belong; evaluating whether an elapsed time of the credential is greater than a maximum lifetime of the credential; and evaluating whether a privilege attribute certificate of the credential is valid; determining that an anomaly exists if: the console command was generated by an invalid domain user; an elapsed time of a credential is greater than a maximum lifetime for the credential; or the privilege attribute certificate of the credential is invalid; and if an anomaly is determined to exist, performing mitigation of the anomaly, wherein the computer system comprises a processor and memory.

In some embodiments, provided herein is the computer-implemented method, wherein the input comprises a console command and command parameters, an intercepted API call, payload data in network packets, and/or a credential ticket.

In some embodiments, provided herein is the computer-implemented method, wherein the input is a file transfer API call that references a file to be transferred, and wherein the method further comprises: determining whether the file to be transferred is an executable; if the file to be transferred is determined to be an executable, transmitting, by the computer system, a report to a security module, wherein the report includes a hash generated from the executable file.

In some embodiments, provided herein is the computer-implemented method, further comprising: receiving, by a security module, a report from one or more other computer systems; performing, by the security module, pattern recognition, wherein the pattern recognition comprises comparing the report to a plurality of predetermined patterns; determining, by the security module, that an alert threshold has been met based on whether the report matches any one of the predetermined pattern.

In some embodiments, provided herein is the computer-implemented method, further comprising: generating an alert, wherein the alert includes data from the reports; and mitigating, by the computer system, the alert by deleting the executable file.

In some embodiments, provided herein is the computer-implemented method, wherein the input comprises network packet data, wherein the network packet data is determined by: intercepting, by the computer system, network packets, wherein the network packets comprise incoming or outgoing packets relative to the computer system; parsing, by the computer system, each packet of the network packets according to a protocol used to generate each packet, in order to obtain network packet data from each packet; and decoding, by the computer system, each packet in order to obtain network packet data from each packet.

In some embodiments, provided herein is the computer-implemented method, wherein performing mitigation of the anomaly comprises deleting the input, adding a representation of the input to an anti-virus software, restoring files modified by the input, and taking steps to reduce actions performed by the input.

In some embodiments, provided herein is the computer-implemented method, wherein evaluating whether the user is a valid domain user to which the credentials belong comprises querying a domain controller to determine whether the user is a member of the domain.

In some embodiments, provided herein is the computer-implemented method, wherein evaluating whether the elapsed time of the credential is greater than a maximum lifetime of the credential comprises determining whether the elapsed time since the credential was issued is greater than the maximum lifetime for that type of credential according to a KERBEROS policy.

In some embodiments, provided herein is the computer-implemented method, wherein evaluating whether a privilege attribute certificate of the credential is valid comprises evaluating logs of a logon server to determine existence of an issuance record of the credential to the user.

In some embodiments, described herein is a computer-implemented method for preventing credential passing attacks, the system comprising: one or more non-transitory computer storage media configured to store computer-executable instructions that when executed by the central coordinating processing node and/or the plurality of processing nodes, cause the central coordinating processing node and/or the plurality of processing nodes to: receive an input; determine whether the input is a credential access command, wherein the determination of whether the input is a credential access command comprises searching for occurrences of references to executables related to adding, reading, copying, or performing actions with respect to a credential in a user session; if the input is determined to be a credential access command, perform anomaly detection corresponding to the credential access command, wherein performing the anomaly detection comprises: evaluating whether a user is a valid domain user to which the credentials belong; evaluating whether an elapsed time of the credential is greater than a maximum lifetime of the credential; and evaluating whether a privilege attribute certificate of the credential is valid; determining that an anomaly exists if: the console command was generated by an invalid domain user; an elapsed time of a credential is greater than a maximum lifetime for the credential; or the privilege attribute certificate of the credential is invalid; and if an anomaly is determined to exist, perform mitigation of the anomaly.

In some embodiments, provided herein is the computer-implemented method, wherein the input comprises a console command and command parameters, an intercepted API call, payload data in network packets, and/or a credential ticket.

In some embodiments, provided herein is the computer-implemented method, wherein the input is a file transfer API call that references a file to be transferred, and wherein the method further comprises: determining whether the file to be transferred is an executable; if the file to be transferred is determined to be an executable, transmitting, by the computer system, a report to a security module, wherein the report includes a hash generated from the executable file.

In some embodiments, provided herein is the computer-implemented method, further comprising: receiving, by a security module, a report from one or more other computer systems; performing, by the security module, pattern recognition, wherein the pattern recognition comprises comparing the report to a plurality of predetermined patterns; determining, by the security module, that an alert threshold has been met based on whether the report matches any one of the predetermined pattern.

In some embodiments, provided herein is the computer-implemented method, further comprising: generating an alert, wherein the alert includes data from the reports; and mitigating, by the computer system, the alert by deleting the executable file.

In some embodiments, provided herein is the computer-implemented method, wherein the input comprises network packet data, wherein the network packet data is determined by: intercepting, by the computer system, network packets, wherein the network packets comprise incoming or outgoing packets relative to the computer system; parsing, by the computer system, each packet of the network packets according to a protocol used to generate each packet, in order to obtain network packet data from each packet; and decoding, by the computer system, each packet in order to obtain network packet data from each packet.

In some embodiments, provided herein is the computer-implemented method, wherein performing mitigation of the anomaly comprises deleting the input, adding a representation of the input to an anti-virus software, restoring files modified by the input, and taking steps to reduce actions performed by the input.

In some embodiments, provided herein is the computer-implemented method, wherein evaluating whether the user is a valid domain user to which the credentials belong comprises querying a domain controller to determine whether the user is a member of the domain.

In some embodiments, provided herein is the computer-implemented method, wherein evaluating whether the elapsed time of the credential is greater than a maximum lifetime of the credential comprises determining whether the elapsed time since the credential was issued is greater than the maximum lifetime for that type of credential according to a KERBEROS policy.

In some embodiments, provided herein is the computer-implemented method, wherein evaluating whether a privilege attribute certificate of the credential is valid comprises evaluating logs of a logon server to determine existence of an issuance record of the credential to the user.

BRIEF DESCRIPTION OF THE DRAWINGS

In order that the advantages of the methods and devices be readily understood, a more particular description briefly described above will be rendered by reference to specific embodiments illustrated in the appended drawings. Understanding that these drawings depict only typical embodiments of the methods and devices and are not therefore to be considered limiting of its scope, the systems, methods, and devices will be described and explained with additional specificity and detail through use of the accompanying drawings.

The drawings are provided to illustrate example embodiments and are not intended to limit the scope of the disclosure. A better understanding of the systems and methods described herein will be appreciated upon reference to the following description in conjunction with the accompanying drawings, wherein:

FIG. 3A is a process flow diagram illustrating an example embodiment(s) of a method for reporting movement of executable files across a;

DETAILED DESCRIPTION

Figure 1A:
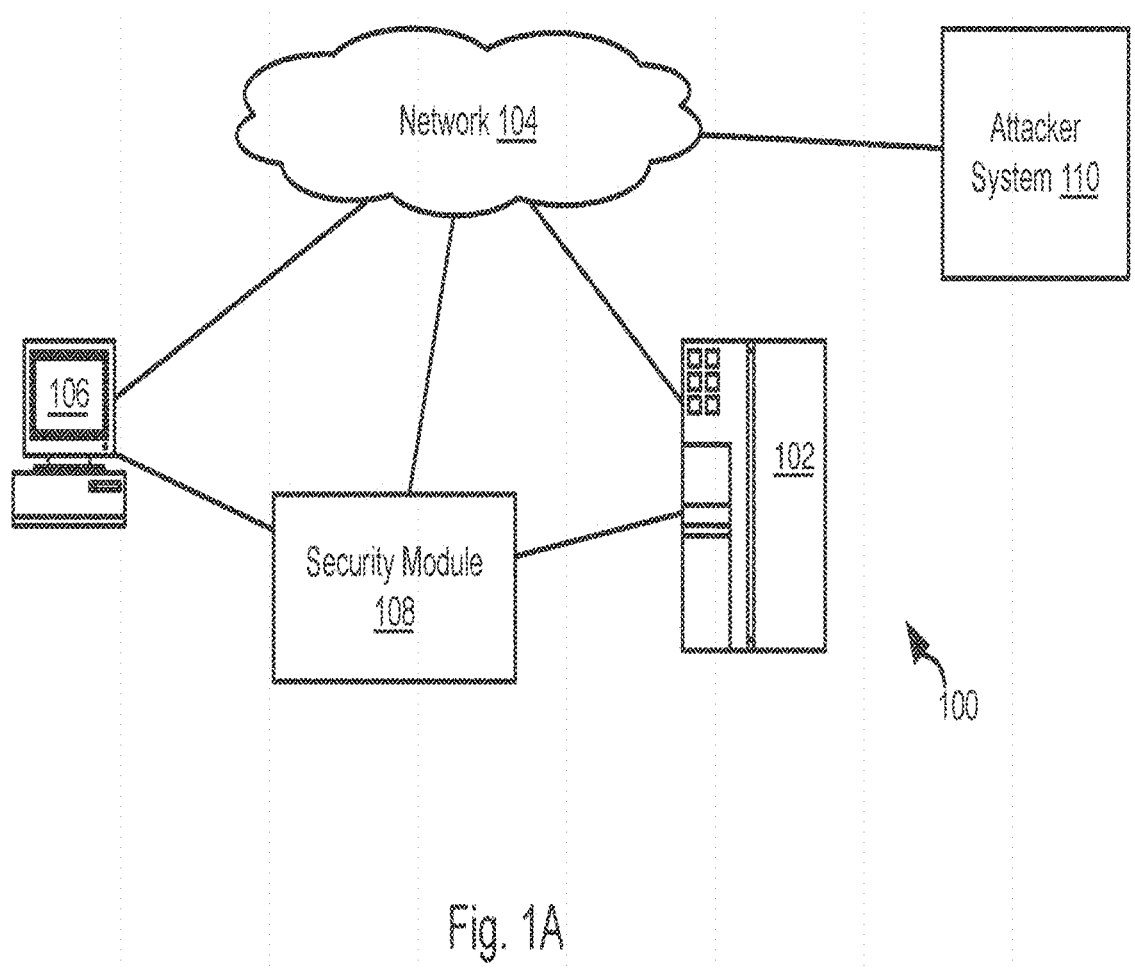
FIG. 1A is a schematic block diagram illustrating an example embodiment(s) of a network environment for performing a method for detecting credential passing attacks.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto or as presented in the future is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

It can be readily understood that the components of the inventive subject, as generally described and illustrated in the Figures herein, can be arranged and designed in a wide variety of different configurations. Thus, the following more detailed description of the embodiments, as represented in the Figures, is not intended to limit the scope of the disclosure, as claimed, but is merely representative of certain examples of presently contemplated embodiments in accordance with the inventive subject matter. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. The presently described embodiments can be best understood by reference to the drawings, wherein like parts are designated by like numerals throughout.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present technology.

Embodiments in accordance with the inventive subject matter may be embodied as an apparatus, systems, method, device, or computer program product. Accordingly, the inventive subject matter may take the form of an entirely hardware embodiment, an entirely software embodiment (including firmware, resident software, micro-code, etc.), or an embodiment combining software and hardware aspects that may all generally be referred to herein as a "module" or "system." Furthermore, the inventive subject matter may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. In some embodiments, a computer-readable medium may comprise any non-transitory medium that can contain, store, communicate, propagate, or transport the program for use by or in connection with the instruction execution system, apparatus, or device.

Computer program code for carrying out operations of the embodiments herein may be written by any combination of one or more programming languages, including an object-oriented programming language such as Java, Smalltalk, C++, or the like, and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The embodiments herein are described below with reference to flowchart illustrations and/or block diagrams of methods, apparatus, systems, and computer program products according to some embodiments. It can be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In some embodiments, these computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In some embodiments, the computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The methods disclosed herein provide an improved approach for preventing credential passing attacks. In an operating system, a KERBEROS protocol may be used for authenticating service requests between trusted hosts across an untrusted network, such as the internet. Under this protocol, a KERBEROS Key Distribution Center (KDC) issues a ticket authenticate a user. The ticket includes a unique session key and timestamp that specifies how long that session is valid. In some attacks, open-source application tools such as Mimikatz and Rubeus can be used to generate forged KERBEROS golden or silver tickets that can be injected into a user session to gain control of an active directory (AD) domain and acquire higher privileges enabling performing any action available to an administrator. An attacker may use these tools to generate a forged golden ticket for a privileged user after stealing credentials of the privileged user from LSASS.exe memory locally. For example, attackers who forge KERBEROS ticket-granting tickets (golden tickets) may generate authentication material for any account. Using these types of tickets, attackers may request TGS tickets to enable access to specific resources. For example, attackers who forge KERBEROS ticket-granting tickets (golden tickets) may generate authentication material for any account. Using these types of tickets, attackers may request TGS tickets to enable access to specific resources. In another example, an attacker may create a silver ticket by cracking a computer account password in order to generate a fake authentication ticket.

For example, a normal domain user may not have the privilege to connect to a domain controller to obtain user login information or user password hashes, such as those that are stored in the NTDS.dit file on the domain controller. To obtain such access, an attacker may (1) obtain access to the user session of a normal domain user, (2) generate the forged golden ticket for a privileged user locally, (3) inject the forged golden ticket into the user session, (4) use the forged golden ticket to grant a silver ticket to access the domain controller, and (5) access the domain controller machine and steal the NTDS.dit file, which is a database file storing all password hashes for all domain users.

In the example attack described above, the attacker may use, for example, a Mimikatz or Rubeus tool and run commands supported by these tools to get the forged golden ticket for an administrator and then insert the ticket into current user session. To do so, these tools may make use of a windows API such as "LsaCallAuthenticationPackage." Using Dynamic Link Library (DLL) hooks, applications accessing this API may be monitored to determine which user is submitting a credential. When a normal domain user submits a credential for a privileged user, this can be detected and blocked according to the embodiments herein. Various approaches for blocking such credential passing attacks are described in detail below.

Referring to FIG. 1A, the methods disclosed herein may be practiced in a network environment 100 including one or more server system(s) 102 connected to a network 104, such as the Internet, local area network (LAN), wide area network (WAN), or another type of network. One or more server systems 102 in the network environment 100 may implement network services (e.g., database, remote desktop, domain name service (DNS), web server, email server, etc.) domain controllers, active directory services, and the like. In some embodiments, one or more user endpoints 106 may access the one or more server systems 102 by means of the network 104. In some embodiments, endpoint 106 may be a desktop or laptop computer, tablet computer, smartphone, wearable computing device, IoT device, or any other type of computing device.

In some embodiments, one or more security modules 108 may execute within the network environment 100 and implement methods ascribed herein to the security module 108. The security module 108 may implement some or all of the functions ascribed to the BotSink in the applications listed in Table 1, which are hereby incorporated herein by reference in their entirety.

TABLE 1

| INCORPORATED APPLICATIONS | | |
|---|---|---|
| Filing Date | Serial No. | Title |
| Nov. 7, 2013 | 14/074,532 | Methods and Apparatus for Redirecting Attacks on a Network |
| May 7, 2014 | 61/989,965 | Distributed System for Bot Detection |
| Aug. 12, 2014 | 14/458,065 | Emulating Successful Shellcode Attacks |
| Aug. 12, 2014 | 14/458,026 | Distributed System for Bot Detection |
| Aug. 22, 2014 | 14/466,646 | Evaluating URLS for Malicious Content |
| Nov. 20, 2014 | 14/549,112 | System and Method for Directing Malicious Activity to a Monitoring System |
| Jul. 21, 2015 | 14/805,202 | Monitoring Access of Network Darkspace |
| Dec. 10, 2015 | 14/965,574 | Database Deception in Directory Services |
| Apr. 29, 2016 | 15/142,860 | Authentication Incident Detection and Management |
| May 12, 2016 | 15/153,471 | Luring Attackers Towards Deception Servers |
| May 17, 2016 | 15/157,082 | Emulating Successful Shellcode Attacks |
| Jul. 7, 2016 | 15/204,779 | Detecting Man-In-The-Middle Attacks |

TABLE 1-continued

INCORPORATED APPLICATIONS

| Filing Date | Serial No. | Title |
| --- | --- | --- |
| Nov. 23, 2016 | 15/460,117 | Implementing Decoys in Network Endpoints |
| Dec. 19, 2016 | 15/383,522 | Deceiving Attackers in Endpoint Systems |
| Sep. 5, 2017 | 15/695,952 | Ransomware Mitigation System |
| Feb. 9, 2018 | 15/893,176 | Implementing Decoys in a Network Environment |
| Sep. 5, 2017 | 15/695,952 | Ransomware Mitigation System |
| Feb. 9, 2018 | 15/893,176 | Implementing Decoys in a Network Environment |
| May 22, 2019 | 16/420,074 | Deceiving Attackers in Endpoint Systems |
| May 31, 2019 | 201921021696 | Implementing Decoys in a Network Environment |
| Aug. 16, 2019 | 16/543,189 | Deceiving Attackers Accessing Active Directory Data |
| Apr. 15, 2020 | 16/849,813 | Deceiving Attackers Accessing Network Data |
| Jul. 13, 2021 | 17/374,087 | Preserving DLL Hooks |

In some embodiments, an attacker system 110 may attempt to access a server system 102 or endpoint 106. In some embodiments, the attacker system 110 may be a separate computer system or malicious code executing on a server system 102 or endpoint 106. As discussed herein, the attacker system 110 may attempt a credential passing attack. One or both of the server system 102 and endpoint 106 may implement methods disclosed herein to detect and/or otherwise mitigate the attack.

The methods disclosed herein may make use of DLL hooks in order to detect and/or otherwise mitigate credential passing attacks. The incorporated applications describe various approaches for implementing DLL hooks, any of which may be used to implement DLL hooks according to the method described herein. For example, U.S. application Ser. No. 15/383,522 describes a system that intercepts certain operating system commands to determine whether the commands reference protected data. The interception of these commands may be implemented by DLL hooks substituted for DLL executables for these commands. In another example, U.S. application Ser. No. 15/695,952 describes a system that modifies file system commands to mitigate ransomware attacks. File system commands may be modified by using a DLL hook to replace a file system command executable with a modified DLL executable performing the modified file system commands. U.S. application Ser. No. 17/374,087 describes various approaches for implementing DLL hooks and preventing detection and removal of DLL hooks.

Figure 1B:
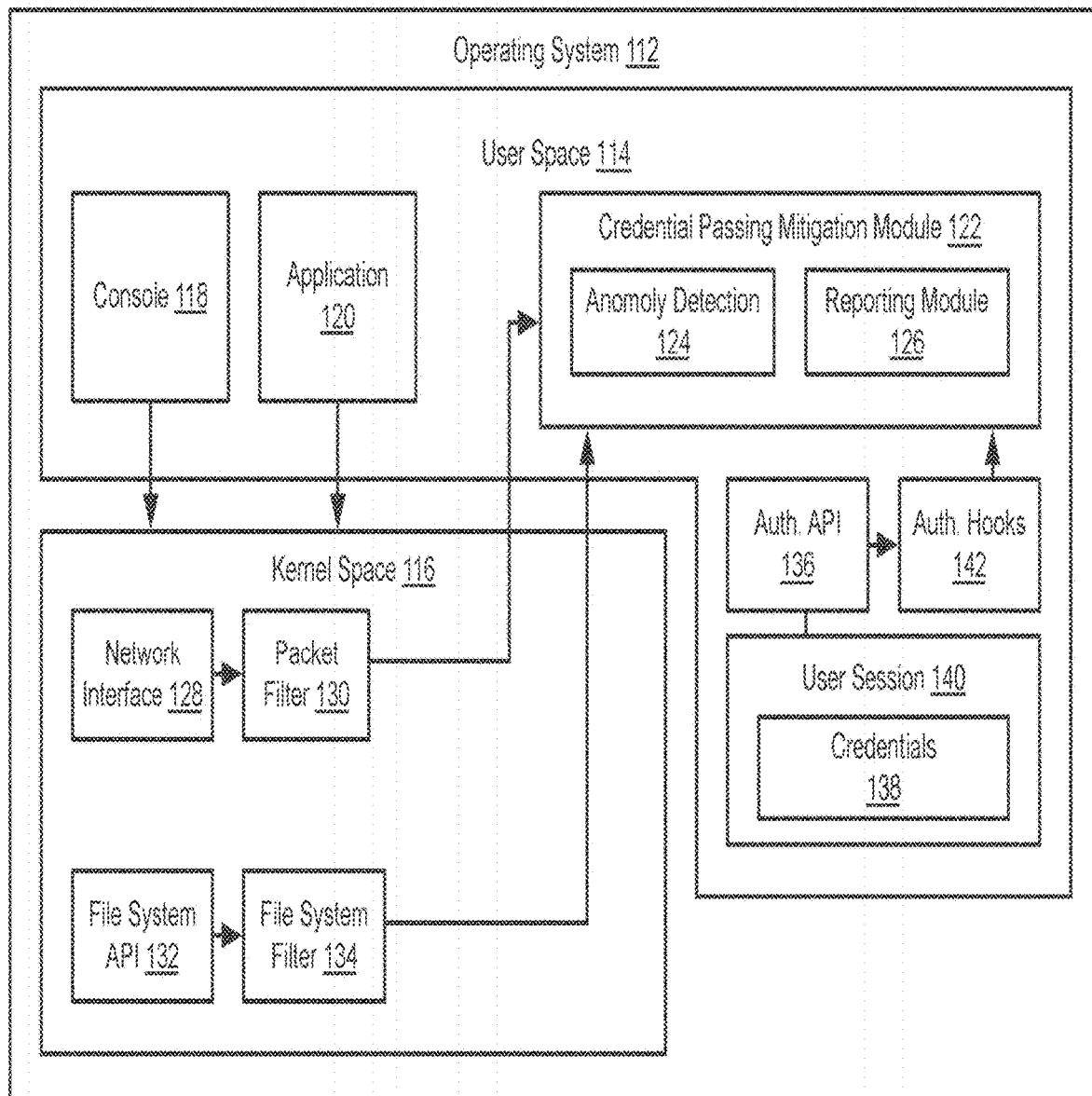
FIG. 1B is schematic block diagram illustrating an example embodiment(s) of components on a computer system for preventing credential passing.

Referring to FIG. 1B, server system 102 and endpoint 106 may implement some or all of the illustrated components. In some embodiments, these components may include an operating system 112. The operating system 112 may be implemented as WINDOWS, LINUX, MACOS, IOS, OSX, or another operating system. In some embodiments, the operating system 112 may define a user space 114 and a kernel space 116. As used herein, the terms "kernel space" and "user space" may be understood to refer to the two types of virtual memory provided by the modern computer operating systems such as LINUX and WINDOWS. Primarily, separation between the kernel and user space serves to provide memory protection and hardware protection from malicious or errant software behavior. In some embodiments, kernel space is strictly reserved for running a privileged operating system kernel, kernel extensions, and most device drivers. In contrast, in some embodiments, user space refers to the memory area used to execute various programs and libraries interacting with the privileged operating system running in the kernel space: software that performs input/output, manipulates file system objects, application software, etc.

In some embodiments, a console 118 (e.g., a command line interface (CU)) and one or more applications 120 may be executed in the user space 114. Methods described herein as being performed on a server system 102 or user endpoint 106 may be implemented by a credential passing mitigation module 122 operating in the user space 114. In some embodiments, the credential passing mitigation module 122 may include an anomaly detection module 124 configured to detect anomalies with respect to credentials used by the operating system 112 to access data and/or services on the computer system executing the operating system 112 or a remote computer system, e.g., server system 102. The operation of the anomaly detection module 124 is described in greater detail below.

In some embodiments, the credential passing mitigation module 122 may further include a reporting module 126. In particular, the reporting module 126 may report activities detected on the computer system hosting the operating system 112 to the security module 108. The operation of the reporting module 126 in cooperation with the security module 108 is described in greater detail below.

In some embodiments, the kernel space 116 may implement a network interface 128 for managing the transmission and receipt of packets over the network 104, establishing network connections over the network 104, encryption and decryption of data transmitted over the network 104, and/or other functions relating to communication over the network 104. As described in greater detail below, a packet filter 130 operating in kernel space 116 may inspect packets received and/or transmitted using the network interface and forward packets identified as suspicious, or data derived therefrom, to the credential passing mitigation module 122.

In some embodiments, the kernel space 116 may implement a file system application programming interface (API) 132 for receiving and processing file system commands from user space 114 (e.g., file, read, write, and create commands and file system navigation commands). In some embodiments, a file system filter 134 may be configured to execute in cooperating with the credential passing mitigation module 122 in order to detect API calls that may be suspicious. In some embodiments, the file system filter 134 may be an executable used in place of a mini filter of the file system API 132 and configured to perform the functions of the mini filter in addition to cooperation with the credential passing mitigation module 122 as described herein. In particular, in some embodiments, the file system filter 134 may detect file system commands and report them to the credential passing mitigation module 122 as described in greater detail below.

In some embodiments, the user space 114 may further execute an authentication API 136. The authentication API 136 may manage, among other things, associating credentials 138 with user session 140. For example, the authentication API 136 may be an API used to read and/or write to the local security authority (LSA) cache in WINDOWS (e.g., LsaCallAuthenticationPackage). The authentication API 136 may therefore implement one or more commands to associate a credential 138 with a user session 140. Credentials 138 may be KERBEROS tickets, public keys, or credentials according to any authentication approach known in the art. In some embodiments, the authentication API 136 may be modified with one or more authentication hooks 142. The authentication hooks may be implemented as DLL hooks that are executed in response to calls to one or more commands of the authentication API, such as calls to one or more commands to add a credential 138 to a user session 140. Upon receipt of an API command associated with an authentication hook 142, the authentication hook 142 may transmit a message to the credential passing mitigation module 122 reporting the API command and parameters received with the command, such as a credential 138 referenced by the command, an identifier of the user in whose session the command was received, and/or other information.

Figure 2A:
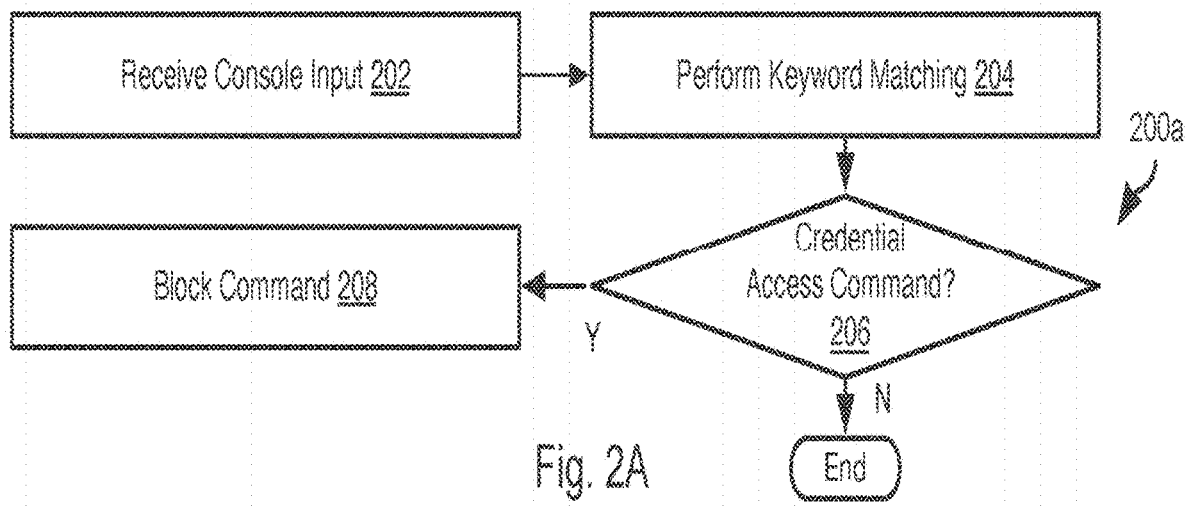
FIG. 2A is a process flow diagram illustrating an example embodiment(s) of a method for detecting credential passing attacks input through a console.

Referring to FIG. 2A, in one embodiment of a credential passing attack, an attacker may read user inputs to a console 118 and attempt to execute the same inputs to achieve the same result, such as gaining access to credentials 138 of the user or inserting a different credential 138 into the user session 140. In some embodiments, the console 118 may be modified to cooperate with the credential passing mitigation module 122 and perform the method 200a.

The method 200a may include receiving an input in the console 118 at step 202. In response to the input, at step 204, the console 118 may perform keyword matching with respect to one or both of a command and command parameters included in the input. In some embodiments, performing keyword matching may include searching for occurrences of API commands related to adding, reading, copying, or performing other actions with respect to credentials 138 in a user session 140. For example, these commands may be those included in the LsaCallAuthenticationPackage in WINDOWS. In some embodiments, performing keyword matching may include searching for references to files or directories storing credentials 138 or references to executables relating to credentials 138 for a user session 140, such as the LSASS.exe that is used for storing credentials in WINDOWS.

If the input from step 202 is found to be a credential access command at step 206, the command is blocked and is not executed, as shown at step 208. The input may be found to be a credential access command if the command and/or parameters of the input are found to include occurrences of keywords evaluated during the keyword matching as described above at step 204. Command blocking the credential access command at step 208 may include refraining from passing the command to the operating system 112, such as an API 132, 136 of the operating system 112 for execution. In some embodiments, commands that are not blocked 208 may be allowed to execute or may be subject to further security checks and allowed to execute if these further security checks are satisfied.

Method 200a therefore has an advantage of preventing insertion of credentials 138 into user session 140. Method 200a may further hinder the creation, writing, or use of forged credentials that is performed using the commands, files, directories, or executables evaluated at keyword matching step 204.

Figure 2B:
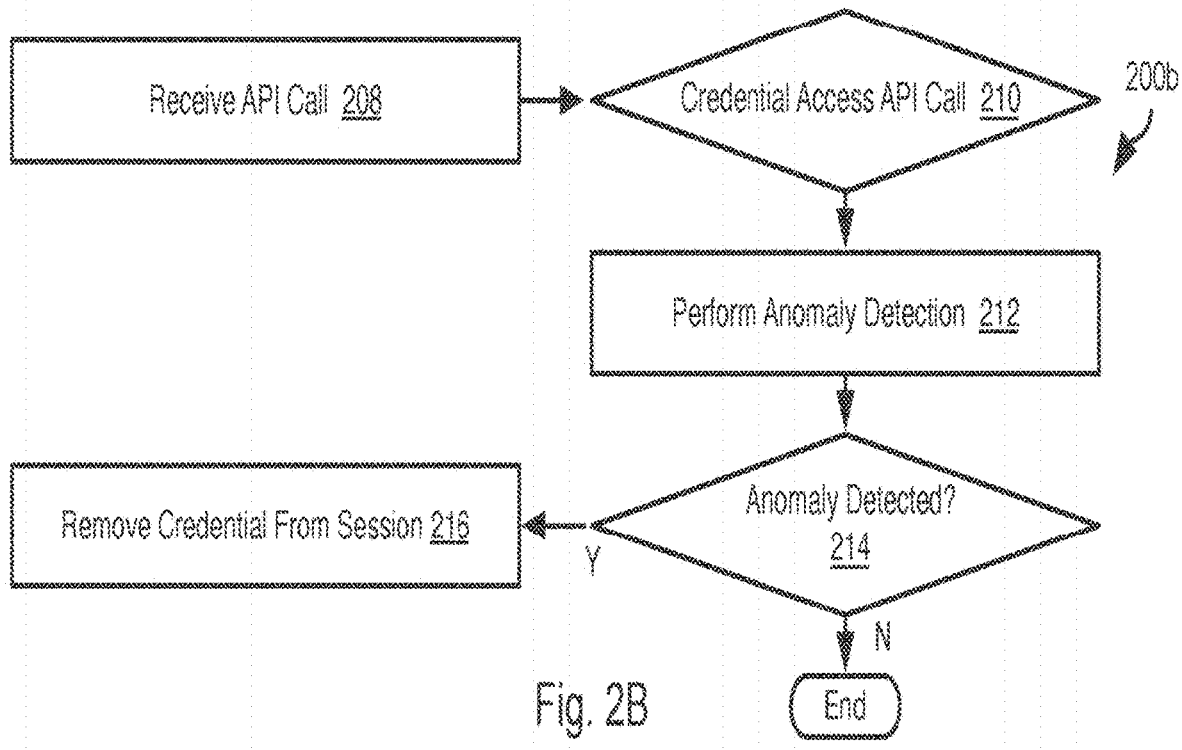
FIG. 2B is a process flow diagram illustrating an example embodiment(s) of a method for detecting API calls performed in a credential passing attack.

Referring to FIG. 2B, in the event that the attacker system 110 does not use a console 118, the method 200b may additionally or alternatively be used to prevent credential passing attacks. The method 200b may include receiving an API call at step 208, such as a call to a command to either of file system API 132 or authentication API 136. In some embodiments, receiving an API call may include detecting the API call using DLL hooks, such as authentication hooks 142 or a modified executable for processing the API call, such as the file system filter 134.

Method 200b may include receiving an API call at step 208. At step 210, the method may evaluate whether the API call is a credential access API call. As noted above, a credential access API call may include an API call relating to creating, adding, reading, copying, or performing other actions with respect to credentials 138 in a user session 140. Credential access API calls may include calls to submit tickets to the LSA cache. A credential access API call may be a call that includes parameters referencing files or directories storing credentials 138 or referencing executables relating to credentials 138 for a user session 140. In some embodiments, step 210 may be omitted since a DLL hook for a credential access API call may inherently invoke subsequent processing of method 200b whenever that credential access API call is invoked.

For each credential access API call identified at step 210 or otherwise determined to be a credential access API call, method 200b may include performing anomaly detection at step 212. For example, an anomaly may occur when a normal (e.g., non-privileged, non-administrator) user attempts to inject a credential granting the user privileges (e.g., administrator or ticket granting privileges). For example, injecting a TGT or TGS may be deemed to be an anomaly. An example method for detecting anomalies may be below with respect to FIG. 5.

If the credential access API call is found to be an anomaly at step 214, the method 200b may include, at step 216, removing a credential referenced by the credential access API call from the user session 140 of the user that submitted the credential access API call. The credential may be an authentic credential obtained without authorization or a forged credential. Removing the credential may prevent the user from using the credential on the computer system performing method 200b or infiltrating other computer systems using the credential.

Figure 3A:
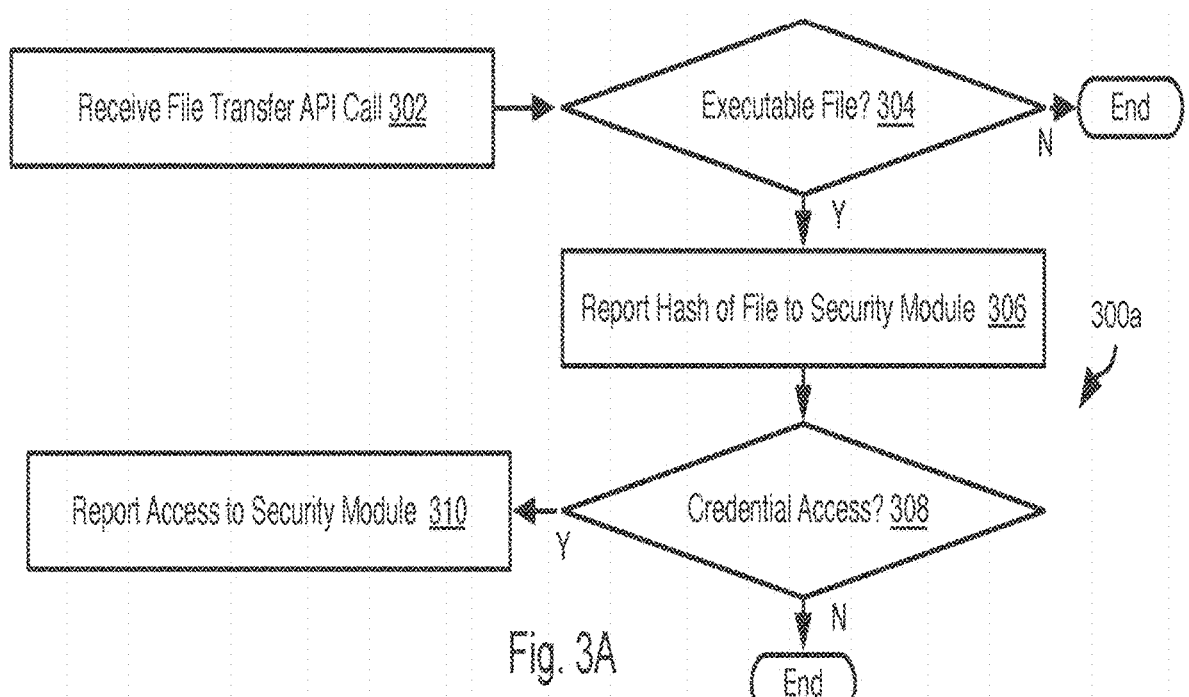
Figure 3B:
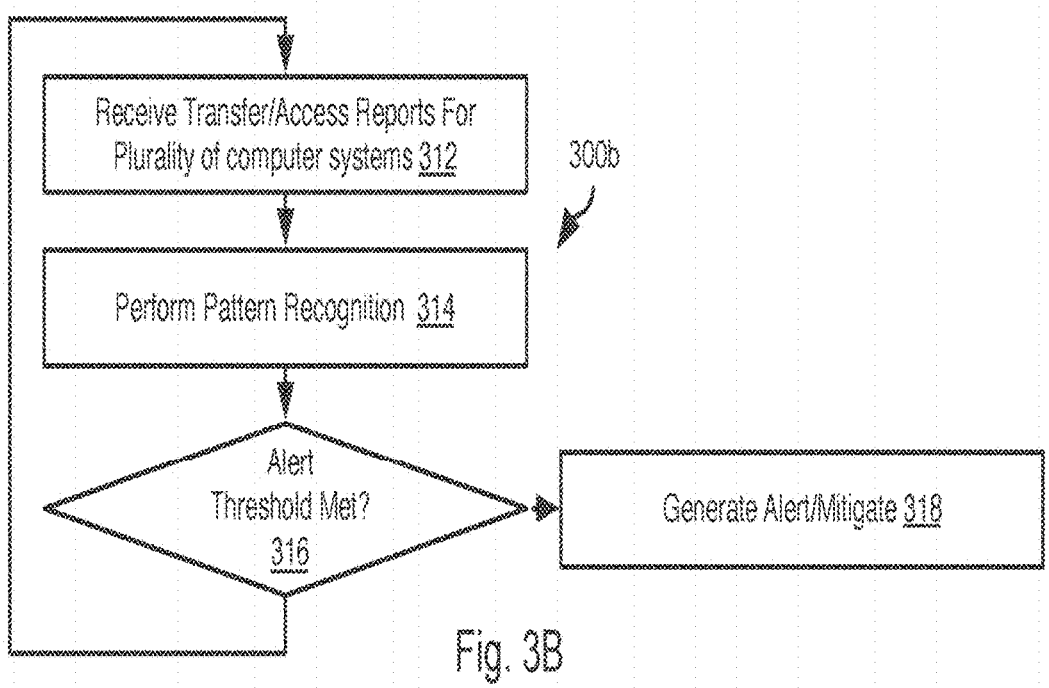
FIG. 3B is a process flow diagram illustrating an example embodiment(s) of a method for monitoring movement of executable files across a network.

FIGS. 3A and 3B illustrate an approach for detecting lateral movement around a network. Once malicious code executes on one computer system of a network, the code will often seek to move laterally, i.e., to copy itself onto other nodes of the network, particularly to nodes that have greater access privileges. In some embodiments, the approach of FIGS. 3A and 3B may be used to detect lateral movement.

FIG. 3A illustrates a method 300a that may be executed on a computer system such as a server system 102 or user endpoint 106. The method 300a may include receiving a file transfer API call at step 302. For example, the file transfer API call may be detected using the modified file system filter 134 or a DLL hook. The file transfer API call may be a command to transfer a file to a remote computer system, such as in the same domain or a different domain as the computer system. Some API calls may include:

the Powershell command: Copy-Item-Path attack.exe-Destination\\servera\c$\windows\system32\attack.exe the CMD.EXE shell command: copy attack.exe\\servera\c$\windows\system32\attack.exe WINDOWS Apis: CreateFile, ReadFile, and WriteFile The method 300a may include, at step 304, evaluating whether the file referenced by the file transfer API call is an executable file. Executable files may include binary executables, scripts, portable executable (PE), or other types of executable code. In some embodiments, other types of files are checked, such as whether the file is a particular kind of executable file, a credential, or other file type. In the following description, executable files are discussed as an example embodiment with the understanding that other types of files could be processed in the same manner.

At step 304, if the file is found to be an executable, the method 300a may include reporting the file to the security module 108 at step 306. A report sent to the security module may include a hash generated from the executable file and transmitting the hash to the security module 108. In some embodiments, the hash may be a locality sensitive or non-locality sensitive hash. Although "hash" is referenced throughout, the hash may be substituted with any value generated as a signature or identifier of a file according to any approach known in the art. In some embodiments, the report may include a file name, file size, or other attributes of the executable file. The report may also include an identifier (IP address, name, machine access code (MAC address), etc.) of one or both of the computer system and the destination computer system to which the executable file was transferred. Where network bandwidth and storage are available, the entire executable file may be transmitted, such as in a compressed and/or encrypted form.

The method 300a may further include monitoring actions performed by the executable file. For example, at step 308, the method may evaluate whether a process executing the executable file has attempted to perform credential access. Whether the process executing the executable file performs credential access may be detected using any of the approaches described herein for detecting a credential passing attack, such as the approach described below with respect to FIG. 5. For example, upon detecting an API call or input to the console 118 relating to credentials as discussed herein, the process that made the API call or generated the input may be identified and the executable being executed by the process may also be identified. If the executable is an executable identified as being transferred according to steps 302 and 304, the condition of step 308 may be found to be met. The type of credential access that is sufficient to meet the condition of step 308 may be that which is identified as anomalous according to any of the approaches described herein. In other embodiments, non-anomalous API calls relating to credentials will also meet the condition of step 308.

At step 310, if the condition of step 308 is found to be met, a report of this may also be transmitted to the security module 108. In some embodiments, the report may include the hash or other identifier of the executable and a description or code representing a description of the action performed, e.g., an attempt to forge a golden ticket or silver ticket, an attempt to insert a credential into a user session, an attempt to insert a credential that is found to be an anomaly according to the methods described herein, or other action.

Referring to FIG. 3B, the method 300b may, at step 312, be executed by the security module 108, such as by the reporting module 126, in response to reports received from one or more computer systems (e.g., server systems 102 and/or user endpoints 106) according to the method 300a. At step 314, the method 300b may include performing pattern recognition with respect to the reports. Below are some non-limiting examples of patterns:

1. A chain of N transfers where N is an integer that is 2 or greater, the chain of transfers including, for example, a transfer of a file matching a hash from computer system $Cs_i$ to computer system $Cs_{i+1}$ at least N times, e.g., CS1, to CS2, . . . to CSN.
2. A report of a transfer from a user endpoint 106 to a server system 102.
3. A first report of a transfer of a hash to a computer system followed by a second report including the same hash and which reports an attempt to insert a credential into a user session on the computer system.
4. A first report including a hash and which reports an attempt to insert a credential into a user session followed by a second report of a transfer of the same hash.
5. Performing correlation with respect to multiple reports from a single endpoint according to a correlation algorithm and the correlation algorithm indicating suspicious activity.

At step 316, the method 300b may further include evaluating whether an alert threshold has been met. In some embodiments, the threshold may include matching any of the patterns checked at step 314. In some embodiments, the threshold may include a minimum chain length of computer systems (e.g., N=2, 3, or some other value) between which the executable file matching a hash has been passed. In some embodiments, the threshold may include a requirement for a chain of a minimum length for an executable file as well as at least one report of credential use by the executable file that is found to be anomalous according to the approach described herein. A chain of minimum length along with other malicious access by an executable file is another example of activity that may meet an alert threshold.

If the alert threshold is found to be met at step 316, the method 300b may include, at step 318, generating an alert, such as in the form of an email, text, or voice message, message output on a computer system operated by an administrator, or some other form. In some embodiments, generating an alert may include transmitting an alert to users of computer systems identified in the reports from step 312. In some embodiments, the alert may include data from the reports or data derived from the reports such as file name of the executable, names and/or addresses of computer systems referenced in the reports, or other data. In some embodiments, an administrator may review the reports or data derived therefrom and take appropriate action.

Step 318 may additionally include performing mitigation. In some embodiments, mitigation may include deleting the executable file found to meet the alert threshold on the computer systems referenced in the reports from step 312. Mitigation may also include adding a representation of the executable file to anti-virus software such that the executable file will be detected and deleted. In some embodiments, mitigation may include restoring files modified by the executable file or taking other steps to reduce actions performed by the executable file. In some embodiments, mitigation may include blocking a source (e.g., attacker system 110 from which the executable file was received.

Figures 4, 5:
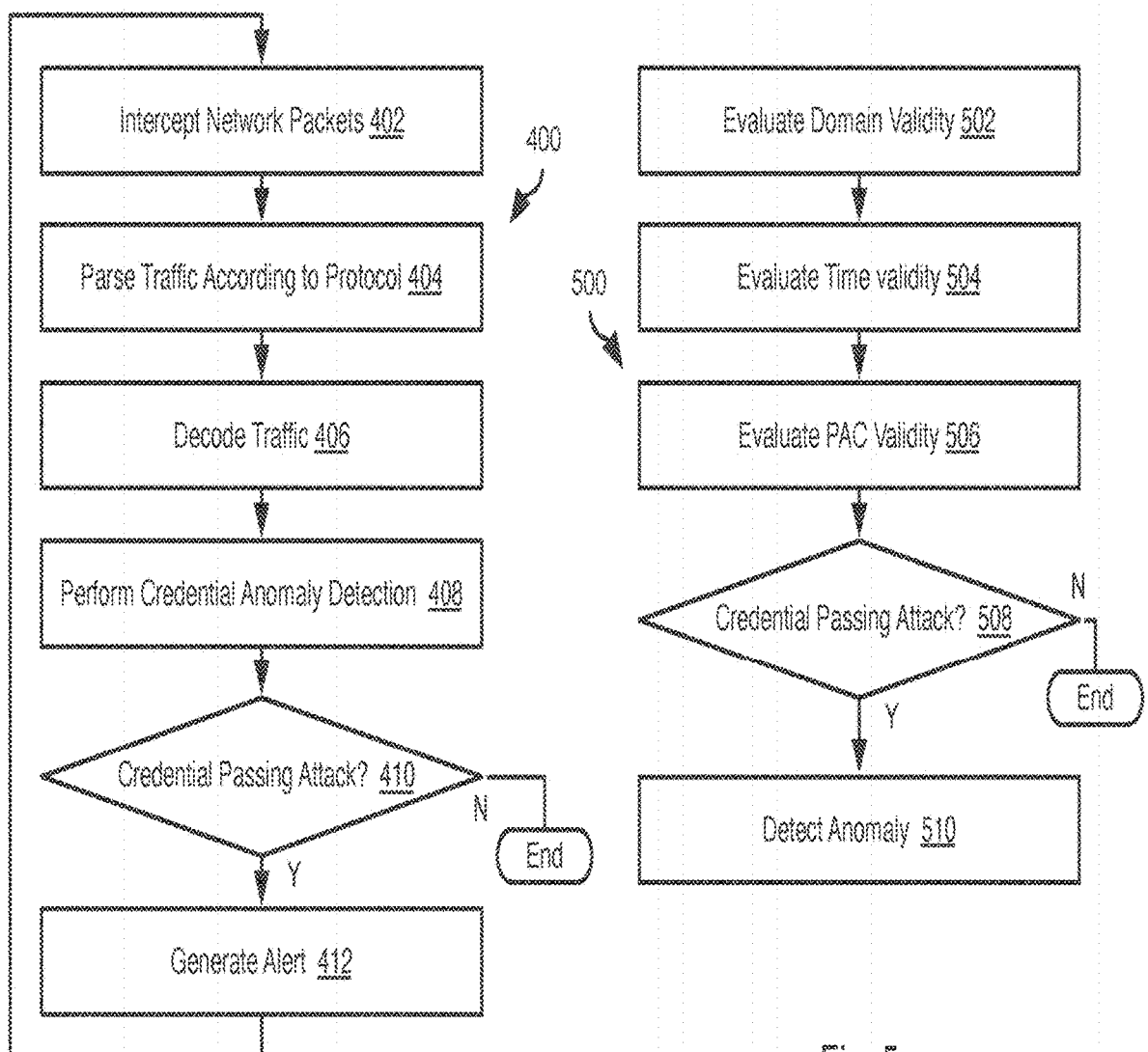
FIG. 4 is a process flow diagram illustrating an example embodiment(s) of a method for processing domain controller traffic.
FIG. 5 is a process flow diagram illustrating an example embodiment(s) of a method for performing anomaly detection.

FIG. 4 illustrates an additional method 400 for preventing credential passing attacks. The method 400 may be performed by a computer system embodied as a server system 102 or a user endpoint 106. In some embodiments, the method 400 may be particularly helpful for computer systems acting as a domain controller, such as an active directory domain controller (ADDC).

The method 400 may include intercepting network packets at step 402. In some embodiments, the intercepted packets may include incoming or outgoing packets relative to the computer system. In some embodiments, the packets may be intercepted by the network interface 128 and passed to the packet filter 130 in kernel space 116. In some embodiments, the packet filter 130 may pass the packets to the credential passing mitigation module 122 in user space 114. In some embodiments the packet filter 130 may selectively pass packets such that some packets are not passed to user space 114. For example, packets received on specific ports may be passed to the user space 114. For example, the packet filter 130 may pass packets received on the KERBEROS port (88), remote procedure call (RPC) Port 135, server message block (SMB) port 445, Dynamic RPC port (49152 to 65535) redirected from port 135, lightweight directory access protocol (LDAP) port 389, or others.

In some embodiments, upon receiving a packet from kernel space 116, the credential passing mitigation module 122 may perform the remaining steps of the method 400. At step 404, the method 400 may include parsing each packet according to protocol used to generate each packet in order to obtain payload data from the packet. In some embodiments, packets may be encrypted such that the packets are decoded at step 406. The credential passing mitigation module 122 may have network connection information, including encryption information for each network connection and may use the connection information to decode 406 the payload data of each packet. In some embodiments, the credential passing mitigation module 122 may assemble payloads from multiple packets received in a network connection to obtain files or other data transmitted over a network connection. In some embodiments, the credential passing mitigation module 122 may obtain a privileged attribute certificate (PAC) from a credential and decode the PAC to obtain data such as user permission, user groups, date and/or time, logon server, and/or other data that may be used for detection anomalies.

At step 408, the method 400 may include performing anomaly detection with respect to the data obtained from parsing and/or decoding the payload data from the packets. For example, performing anomaly detection may include performing any of the approaches described herein for detecting credential passing attacks. In particular, step 408 may include evaluating whether the payload data includes a network credential, or other action that may be part of a credential passing attack. In some embodiments, step 408 may include performing the anomaly detection approach of FIG. 5 with respect to credentials included in or referenced by the payload data.

At step 410, the method 400 may include evaluating whether the anomaly detection at step 408 identified an anomaly corresponding to a credential passing attack. If so, an alert may be generated at step 412 and/or mitigation may be performed. In some embodiments, step 412 may include performing some or all of the actions described above with respect to step 318. In particular, an executable that generated the packets found to indicate an anomaly at step 412 may be mitigated as described above with respect to step 318.

FIG. 5 illustrates a method 500 that may be used to perform anomaly detection. In some embodiments, the method 500 may be performed with respect to a credential referenced by a console command, intercepted API call, or payload data in network packets according to the methods described herein. In particular, in some embodiments, data obtained from decoding a PAC in the credential may be used. In some embodiments, the method 500 may also be performed with respect to a user, i.e., user session that generated the console command, API call, or payload data that references the credential. In some embodiments, the method 500 may be performed by the anomaly detection module 124 and/or the security module 108.

In some embodiments, at step 502, the method may include evaluating whether the user is a valid domain user for the domain to which the credential belongs. For example, the PAC may indicate that the user is a member of a domain, e.g., an administrator domain. In some embodiments, the method 500 may include querying a domain controller to determine whether the user is in fact a member of that domain. In some embodiments, step 502 may include evaluating whether or not the user is associated with user group membership data in the PAC. This may also include querying the domain controller to determine whether the user is a member of the group referenced in the group membership data included in the PAC.

In some embodiments, at step 504, evaluating whether a credential that is a golden ticket or silver ticket is still valid according to a maximum lifetime, i.e. whether the elapsed time since the credential was issued is greater than the maximum lifetime for that type of ticket (golden or silver) according to a KERBEROS policy of a domain for which the credential purports to be valid. For example, the PAC may include a date and/or time indicating when it was purportedly issued. Step 504 may include evaluating whether the time elapsed since the date and/or time Is greater than the maximum lifetime according to the KERBEROS policy.

In some embodiments, at step 506, evaluating whether the PAC received in the credential is valid or not. Step 506 may further include obtaining an identifier of a logon server from the PAC. Step 506 may include evaluating logs of the logon server to determine if there is a record of issuing the credential to the user. If not, the credential may be found to be invalid. There may be multiple logon servers used in a load-balancing arrangement such that the identifier of the logon server may be used to determine which of the logon servers is claimed to have issued the credential.

The method 500 may further include, at step 508, evaluating whether some or all of steps 502-506 indicate a credential passing attack. In some embodiments, only one, any two, or all three of steps 502-506 may indicate a credential passing attack: the user is not a valid domain user or not associated with group membership data of the PAC, the maximum lifetime has elapsed, and/or the PAC is not valid. If a credential passing attack is found 508 to be indicated, then an anomaly is detected 510. Otherwise, the method 500 may end.

Figure 6:
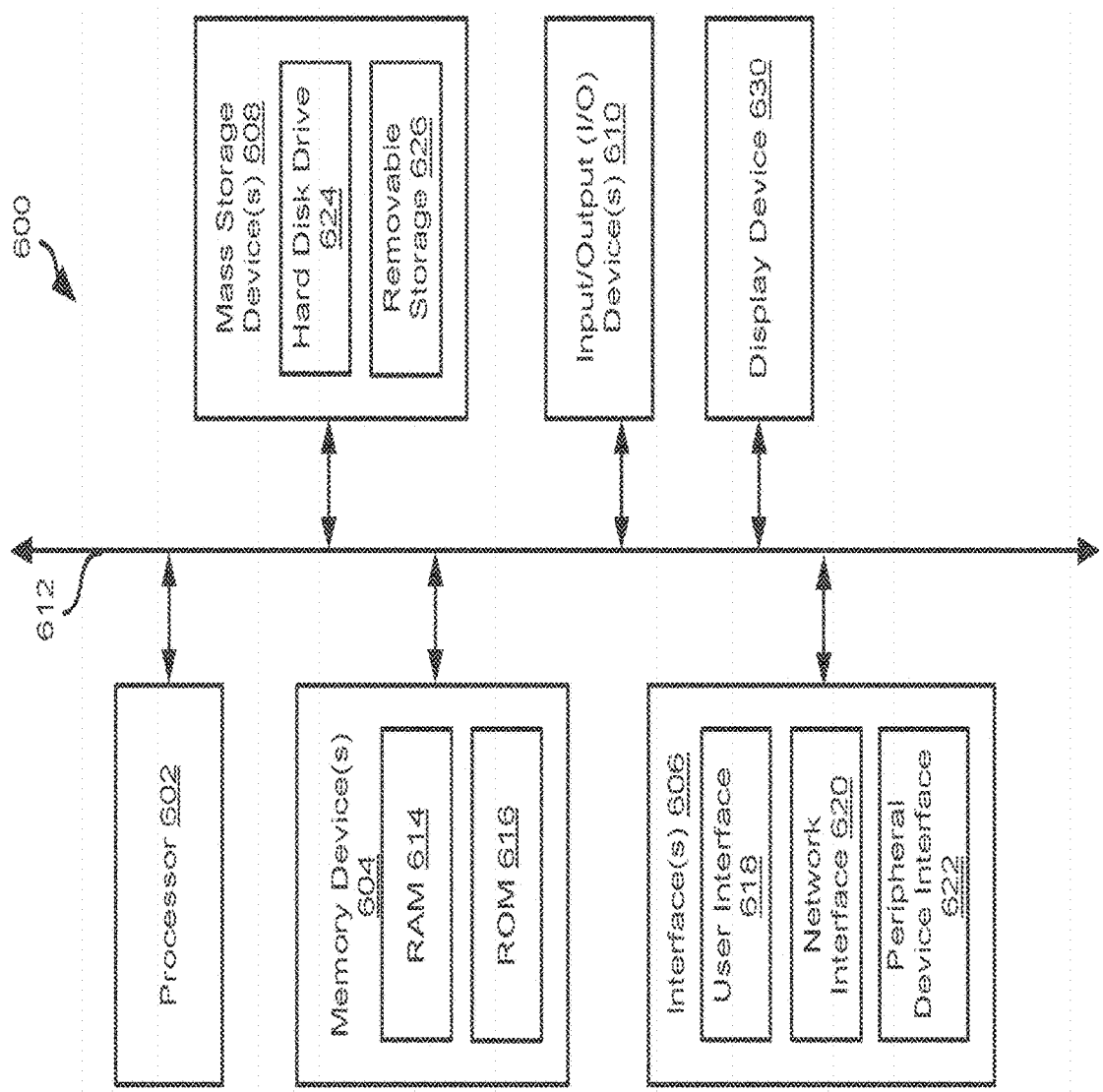
FIG. 6 is a schematic block diagram illustrating an example embodiment(s) of a computer system suitable for implementing the present methods.

FIG. 6 is a block diagram illustrating an example computing device 600 which can be used to implement the system and methods disclosed herein. In some embodiments, each server system 102, user endpoint 106, and attacker system 110 may have some or all of the attributes of the computing device 600. In some embodiments, a cluster of computing devices interconnected by a network may be used to implement any one or more components of the invention.

In some embodiments, computing device 600 may be used to perform various procedures, such as those discussed herein. For example, computing device 600 can function as a server, a client, or any other computing entity. Computing device can perform various monitoring functions as discussed herein, and can execute one or more application programs, such as the application programs described herein. Computing device 600 can be any of a wide variety of computing devices, such as a desktop computer, a notebook computer, a server computer, a handheld computer, tablet computer and the like.

In some embodiments, computing device 600 may include one or more processor(s) 602, one or more memory device(s) 604, one or more interface(s) 606, one or more mass storage device(s) 608, one or more Input/Output (I/O) device(s) 610, and a display device 630 all of which are coupled to a bus 612. In some embodiments, processor(s) 602 may include one or more processors or controllers that execute instructions stored in memory device(s) 604 and/or mass storage device(s) 608. Processor(s) 602 may also include various types of computer-readable media, such as cache memory.

Memory device(s) 604 may include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 may include various computer readable media, such as magnetic tapes, magnetic disks, optical disks, solid-state memory (e.g., Flash memory), and so forth. As shown in FIG. 6, mass storage device 608 may be a hard disk drive 624. Various drives may also be included in mass storage device(s) 608 to enable reading from and/or writing to the various computer readable media. In some embodiments, mass storage device(s) 608 may include removable media 626 and/or non-removable media.

I/O device(s) 610 may include various devices that allow data and/or other information to be input to or retrieved from computing device 600. For example, I/O device(s) 610 may include cursor control devices, keyboards, keypads, microphones, monitors or other display devices, speakers, printers, network interface cards, modems, lenses, CCDs or other image capture devices, and the like.

Display device 630 may include any type of device capable of displaying information to one or more users of computing device 600. For example, display device 630 may include a monitor, display terminal, video projection device, and the like.

Interface(s) 606 may include various interfaces that allow computing device 600 to interact with other systems, devices, or computing environments. Example interface(s) 606 may include any number of different network interfaces 620, such as interfaces to local area networks (LANs), wide area networks (WANs), wireless networks, and the Internet. Other interface(s) may include user interface 618 and peripheral device interface 622. The interface(s) 606 may also include one or more user interface elements 618. The interface(s) 606 may also include one or more peripheral interfaces such as interfaces for printers, pointing devices (mice, track pad, etc.), keyboards, and the like.

Bus 612 may allow processor(s) 602, memory device(s) 604, interface(s) 606, mass storage device(s) 608, and I/O device(s) 610 to communicate with one another, as well as other devices or components coupled to bus 612. Bus 612 may represent one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600 and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Computer Systems

Figure 7:
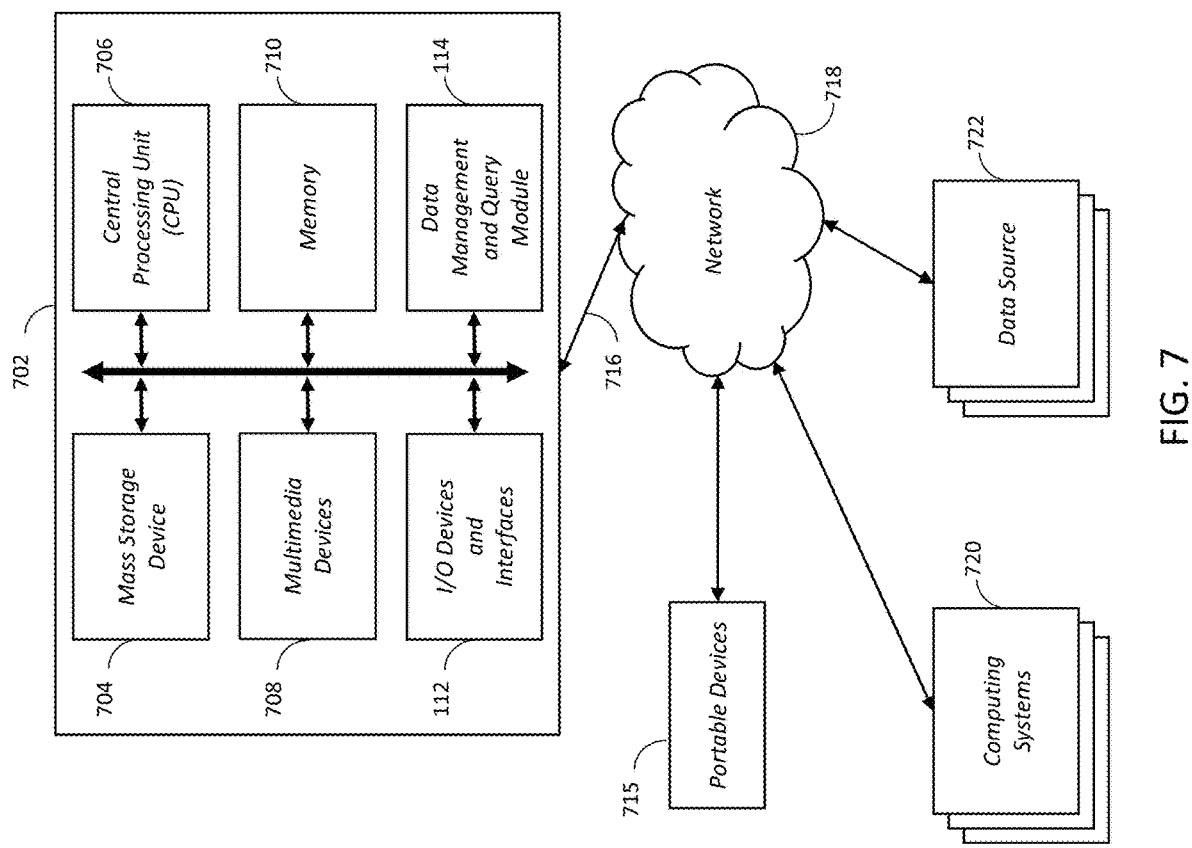
FIG. 7 is a schematic block diagram illustrating an example embodiment(s) of components on a computer system.

FIG. 7 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 1. The example computer system 702 is in communication with one or more computing systems 720 and/or one or more data sources 722 via one or more networks 718. While FIG. 7 illustrates an embodiment of a computing system 702, it is recognized that the functionality provided for in the components and modules of computer system 702 may be combined into fewer components and modules, or further separated into additional components and modules.

The computer system 702 can comprise a data management and query module 114 that carries out the functions, methods, acts, and/or processes described herein. The data management and query module 714 is executed on the computer system 702 by a central processing unit 706 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 702 includes one or more processing units (CPU) 706, which may comprise a microprocessor. The computer system 702 further includes a physical memory 710, such as random-access memory (RAM) for temporary storage of information, a read only memory (ROM) for permanent storage of information, and a mass storage device 704, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 702 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 702 includes one or more input/output (I/O) devices and interfaces 712, such as a keyboard, mouse, touch pad, and printer. The I/O devices and interfaces 712 can include one or more display devices, such as a monitor, which allows the visual presentation of data to a user. More particularly, a display device provides for the presentation of GUIs as application software data, and multi-media presentations, for example. The I/O devices and interfaces 712 can also provide a communications interface to various external devices. The computer system 702 may comprise one or more multi-media devices 708, such as speakers, video cards, graphics accelerators, and microphones, for example.

The computer system 702 may run on a variety of computing devices, such as a server, a Windows server, a Structure Query Language server, a Unix Server, a personal computer, a laptop computer, and so forth. In other embodiments, the computer system 702 may run on a cluster computer system, a mainframe computer system and/or other computing system suitable for controlling and/or communicating with large databases, performing high volume transaction processing, and generating reports from large databases. The computing system 702 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 702 illustrated in FIG. 7 is coupled to a network 718, such as a LAN, WAN, or the Internet via a communication link 116 (wired, wireless, or a combination thereof). Network 718 communicates with various computing devices and/or other electronic devices 715. Network 718 is communicating with one or more computing systems 720 and one or more data sources 722. The data management and query module 714 may access or may be accessed by computing systems 720 and/or data sources 722 through a web-enabled user access point. Connections may be a direct physical connection, a virtual connection, and other connection type. The web-enabled user access point may comprise a browser module that uses text, graphics, audio, video, and other media to present data and to allow interaction with data via the network 718.

Access to the data management and query module 714 of the computer system 102 by computing systems 720 and/or by data sources 722 may be through a web-enabled user access point such as the computing systems' 720 or data source's 722 personal computer, cellular phone, smartphone, laptop, tablet computer, e-reader device, audio player, or another device capable of connecting to the network 718. Such a device may have a browser module that is implemented as a module that uses text, graphics, audio, video, and other media to present data and to allow interaction with data via the network 718.

The output module may be implemented as a combination of an all-points addressable display such as a cathode ray tube (CRT), a liquid crystal display (LCD), a plasma display, or other types and/or combinations of displays. The output module may be implemented to communicate with input devices 712 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 702 may comprise a physical or logical connection established between a remote microprocessor and a mainframe host computer for the express purpose of uploading, downloading, or viewing interactive data and databases online in real time. The remote microprocessor may be operated by an entity operating the computer system 702, including the client server systems or the main server system, an/or may be operated by one or more of the data sources 722 and/or one or more of the computing systems 720. In some embodiments, terminal emulation software may be used on the microprocessor for participating in the micro-mainframe link.

In some embodiments, computing systems 720 who are internal to an entity operating the computer system 702 may access the data management and query module 714 internally as an application or process run by the CPU 706.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 702 may include one or more internal and/or external data sources (for example, data sources 722). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Real-time Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or The computer system 702 may also access one or more databases 722. The databases 122 may be stored in a database or data repository. The computer system 702 may access the one or more databases 722 through a network 718 or may directly access the database or data repository through I/O devices and interfaces 712. The data repository storing the one or more databases 722 may reside within the computer system 702.

ADDITIONAL EMBODIMENTS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A computer-implemented method for preventing credential passing attacks, the computer-implemented method comprising:
   receiving, by a computer system, an input;
   determining, by a credential passing mitigation module, whether the input is a credential access command, wherein the determination of whether the input is a credential access command comprises searching for occurrences of references to executables related to adding, reading, copying, or performing actions with respect to a credential in a user session;
   if the input is determined to be a credential access command, performing, by an anomaly detection module, anomaly detection corresponding to the credential access command, wherein performing the anomaly detection comprises:
      evaluating whether a user is a valid domain user to which the credential belong;
      evaluating whether an elapsed time of the credential is greater than a maximum lifetime of the credential; and
      evaluating whether a privilege attribute certificate of the credential is valid;
   determining that an anomaly exists if:
      (i) a console command was generated by an invalid domain user;
      (ii) an elapsed time of the credential is greater than a maximum lifetime for the credential; or
      (iii) the privilege attribute certificate of the credential is invalid; and
   if an anomaly is determined to exist, performing mitigation of the anomaly,
   wherein the computer system comprises a processor and memory.

2. The computer-implemented method of claim 1, wherein the input comprises a console command and command parameters, an intercepted application programming interface (API) call, payload data in network packets, and/or a credential ticket.

3. The computer-implemented method of claim 1, wherein the input is a file transfer application programming interface (API) call that references a file to be transferred, and wherein the method further comprises:
   determining whether the file to be transferred is an executable; and
   if the file to be transferred is determined to be an executable, transmitting, by the computer system, a report to a security module, wherein the report includes a hash generated from the executable file.

4. The computer-implemented method of claim 1, further comprising:
   receiving, by a security module, a report from one or more other computer systems;
   performing, by the security module, pattern recognition, wherein the pattern recognition comprises comparing the report to a plurality of predetermined patterns; and
   determining, by the security module, that an alert threshold has been met based on whether the report matches any one of the plurality of predetermined patterns.

5. The computer-implemented method of claim 4, further comprising:
   generating an alert, wherein the alert includes data from the report; and mitigating, by the computer system, the alert by deleting the executables.

6. The computer-implemented method of claim 1, wherein the input comprises network packet data, wherein the network packet data is determined by:
   intercepting, by the computer system, network packets, wherein the network packets comprise incoming or outgoing packets relative to the computer system;

parsing, by the computer system, each packet of the network packets according to a protocol used to generate each packet, in order to obtain network packet data from each packet; and decoding, by the computer system, each packet in order to obtain network packet data from each packet.

7. The computer-implemented method of claim 1, wherein performing mitigation of the anomaly comprises deleting the input, adding a representation of the input to an anti-virus software, restoring files modified by the input, and taking steps to reduce actions performed by the input.

8. The computer-implemented method of claim 1, wherein evaluating whether the user is a valid domain user to which the credential belong comprises querying a domain controller to determine whether the user is a member of the domain.

9. The computer-implemented method of claim 1, wherein evaluating whether the elapsed time of the credential is greater than a maximum lifetime of the credential comprises determining whether the elapsed time since the credential was issued is greater than the maximum lifetime for that type of credential according to a KERBEROS policy.

10. The computer-implemented method of claim 1, wherein evaluating whether a privilege attribute certificate of the credential is valid comprises evaluating logs of a logon server to determine existence of an issuance record of the credential to the user.

11. A computer system for preventing credential passing attacks, the computer system comprising:
   one or more non-transitory computer storage media configured to store computer-executable instructions that when executed by a central coordinating processing node and/or a plurality of processing nodes, cause the central coordinating processing node and/or the plurality of processing nodes to:
   receive an input;
   determine whether the input is a credential access command, wherein the determination of whether the input is a credential access command comprises searching for occurrences of references to executables related to adding, reading, copying, or performing actions with respect to a credential in a user session;
   if the input is determined to be a credential access command, perform anomaly detection corresponding to the credential access command, wherein performing the anomaly detection comprises:
     evaluating whether a user is a valid domain user to which the credential belong;
     evaluating whether an elapsed time of the credential is greater than a maximum lifetime of the credential; and
     evaluating whether a privilege attribute certificate of the credential is valid;
   determining that an anomaly exists if:
     (i) a console command was generated by an invalid domain user;
     (ii) an elapsed time of the credential is greater than a maximum lifetime for the credential; or
     (iii) the privilege attribute certificate of the credential is invalid; and if an anomaly is determined to exist, perform mitigation of the anomaly.

12. The computer system of claim 11, wherein the input comprises a console command and command parameters, an intercepted application programming interface (API) call, payload data in network packets, and/or a credential ticket.

13. The computer system of claim 11, wherein the input is a file transfer application programming interface (API) call that references a file to be transferred, and wherein the method further comprises:
   determining whether the file to be transferred is an executable; and
   if the file to be transferred is determined to be an executable, transmitting, by the computer system, a report to a security module, wherein the report includes a hash generated from the executable file.

14. The computer system of claim 11, further comprising:
   receiving, by a security module, a report from one or more other computer systems;
   performing, by the security module, pattern recognition, wherein the pattern recognition comprises comparing the report to a plurality of predetermined patterns; and
   determining, by the security module, that an alert threshold has been met based on whether the report matches any one of the plurality of predetermined patterns.

15. The computer system of claim 14, further comprising:
   generating an alert, wherein the alert includes data from the report; and
   mitigating, by the computer system, the alert by deleting the executables.

16. The computer system of claim 11, wherein the input comprises network packet data, wherein the network packet data is determined by:
   intercepting, by the computer system, network packets, wherein the network packets comprise incoming or outgoing packets relative to the computer system;
   parsing, by the computer system, each packet of the network packets according to a protocol used to generate each packet, in order to obtain network packet data from each packet; and
   decoding, by the computer system, each packet in order to obtain network packet data from each packet.

17. The computer system of claim 11, wherein performing mitigation of the anomaly comprises deleting the input, adding a representation of the input to an anti-virus software, restoring files modified by the input, and taking steps to reduce actions performed by the input.

18. The computer system of claim 11, wherein evaluating whether the user is a valid domain user to which the credential belong comprises querying a domain controller to determine whether the user is a member of the domain.

19. The computer system of claim 11, wherein evaluating whether the elapsed time of the credential is greater than a maximum lifetime of the credential comprises determining whether the elapsed time since the credential was issued is greater than the maximum lifetime for that type of credential according to a KERBEROS policy.

20. The computer system of claim 11, wherein evaluating whether a privilege attribute certificate of the credential is valid comprises evaluating logs of a logon server to determine existence of an issuance record of the credential to the user.

* * * * *